US012572541B2

(12) United States Patent
Daniel et al.

(10) Patent No.: US 12,572,541 B2
(45) Date of Patent: Mar. 10, 2026

(54) CROSS-CLUSTER SEARCH OPTIMIZATION

(71) Applicant: CrowdStrike, Inc., Sunnyvale, CA (US)

(72) Inventors: Kenn Daniel, Aarhus (DK); Mike Rostermund, Aarhus (DK)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/754,274

(22) Filed: Jun. 26, 2024

(65) Prior Publication Data

US 2026/0003864 A1     Jan. 1, 2026

(51) Int. Cl.
G06F 16/2453     (2019.01)
(52) U.S. Cl.
CPC .............................. G06F 16/24542 (2019.01)
(58) Field of Classification Search
CPC .................................................. G06F 16/24542
See application file for complete search history.

(56) References Cited

U.S. PATENT DOCUMENTS

| | | | | |
|---|---|---|---|---|
| 9,965,788 B2 * | 5/2018 | Srivastava | .......... | G06F 16/3338 |
| 11,914,592 B2 | 2/2024 | Leau | | |
| 2010/0036818 A1 * | 2/2010 | Valencia-Campo | ......................... | G06F 18/2111 |
| | | | | 707/711 |
| 2014/0040275 A1 * | 2/2014 | Dang | ...................... | G06F 40/30 |
| | | | | 707/741 |
| 2016/0034525 A1 * | 2/2016 | Neels | .................... | G06F 16/285 |
| | | | | 707/737 |

| | | | | |
|---|---|---|---|---|
| 2018/0246957 A1 * | 8/2018 | Ago | ...................... | G06F 16/328 |
| 2020/0050707 A1 * | 2/2020 | Tsykynovskyy | .... | G06F 16/3347 |
| 2023/0161792 A1 * | 5/2023 | Pandis | .............. | G06F 16/24542 |
| | | | | 707/718 |

(Continued)

FOREIGN PATENT DOCUMENTS

CN          104008210          8/2014

OTHER PUBLICATIONS

Tags on Clusters, MongoDB, accessed on or about May 14, 2024, https://www.mongodb.com/docs/atlas/database-deployment-tags/.

(Continued)

*Primary Examiner* — Dangelino N Gortayo
(74) *Attorney, Agent, or Firm* — Law Office of Scott P. Zimmerman, PLLC

(57)          ABSTRACT

A preliminary tag search improves computer functioning by reducing cross-cluster searches. Today's cloud service providers maintain large, distributed datasets stored by multiple clusters having many nodes. Many cross-cluster searches generate no search results, but unsuccessful cross-cluster searches still consume much hardware resources, network bandwidth, and electrical energy. The preliminary tag search eliminates unfruitful cross-cluster searches. The preliminary tag search may identify only the cross-cluster searches that will generate positive search results. The preliminary tag search may identify wasteful cross-cluster searches that would generate no search results. Prior to conducting cross-cluster searches, a distributed database service may first perform the preliminary tag search that identifies successful/unsuccessful cross-cluster searches. The distributed database service may then decline or skip unsuccessful cross-cluster searches.

20 Claims, 21 Drawing Sheets

(56)                    References Cited

U.S. PATENT DOCUMENTS

2024/0403333 A1 * 12/2024 Bertschinger ......... G06F 16/287

OTHER PUBLICATIONS

Search across clusters, Elastic, accessed on or about May 14, 2024, https://www.elastic.co/guide/en/elasticsearch/reference/current/modules-cross-cluster-search.html.
Brookes, Neil, "use Cross Cluster Search with Elastic Cloud to improve observability", Dec. 16, 2021.

* cited by examiner

Figure 3:
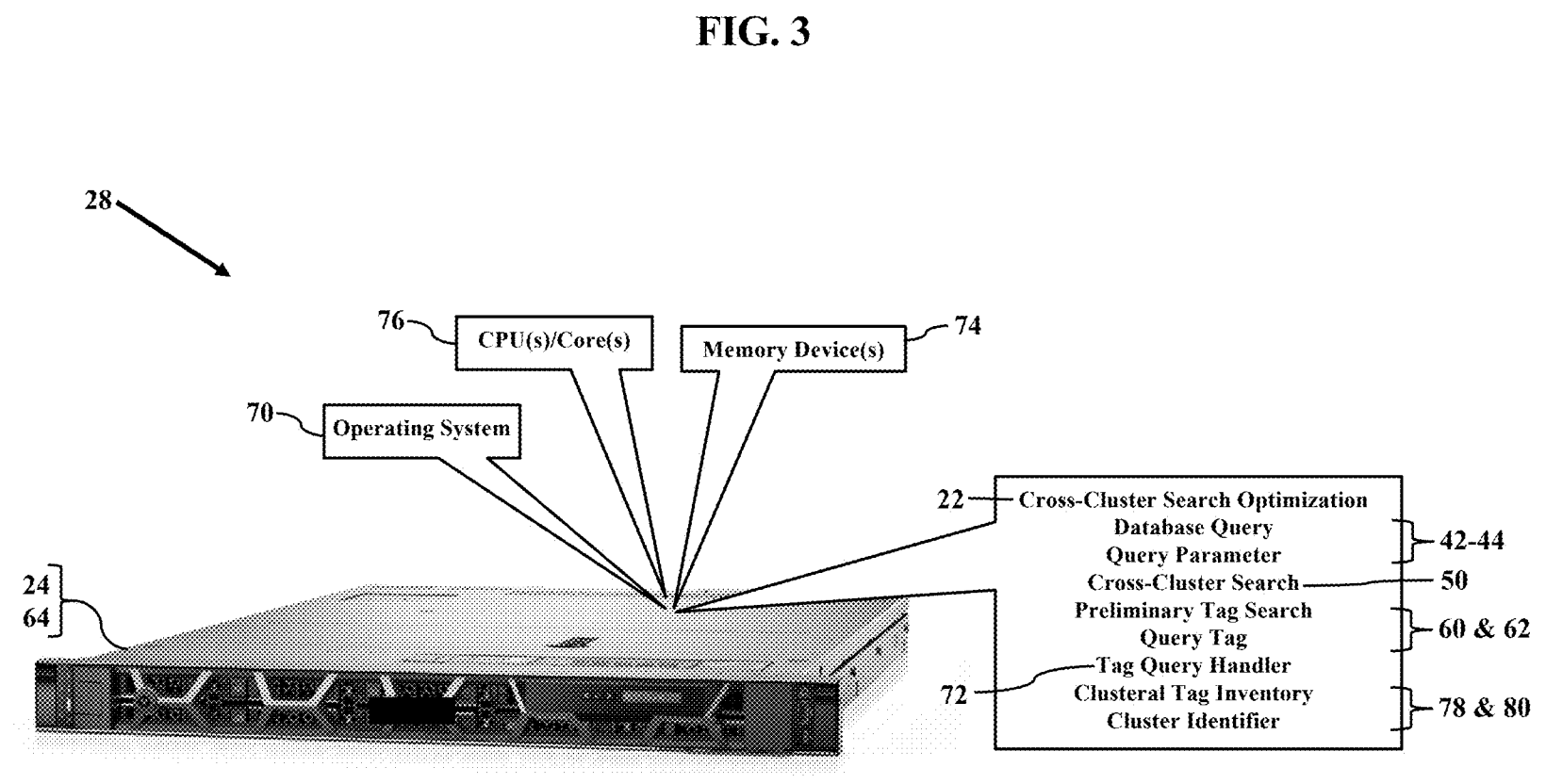

76 — CPU(s)/Core(s)

74 — Memory Device(s)

70 — Operating System

22 — Cross-Cluster Search Optimization

Database Query — 42-44

Query Parameter — 50

Cross-Cluster Search

Preliminary Tag Search — 60 & 62

Query Tag

Tag Query Handler

Clusteral Tag Inventory

Cluster Identifier — 78 & 80

Figure 4:
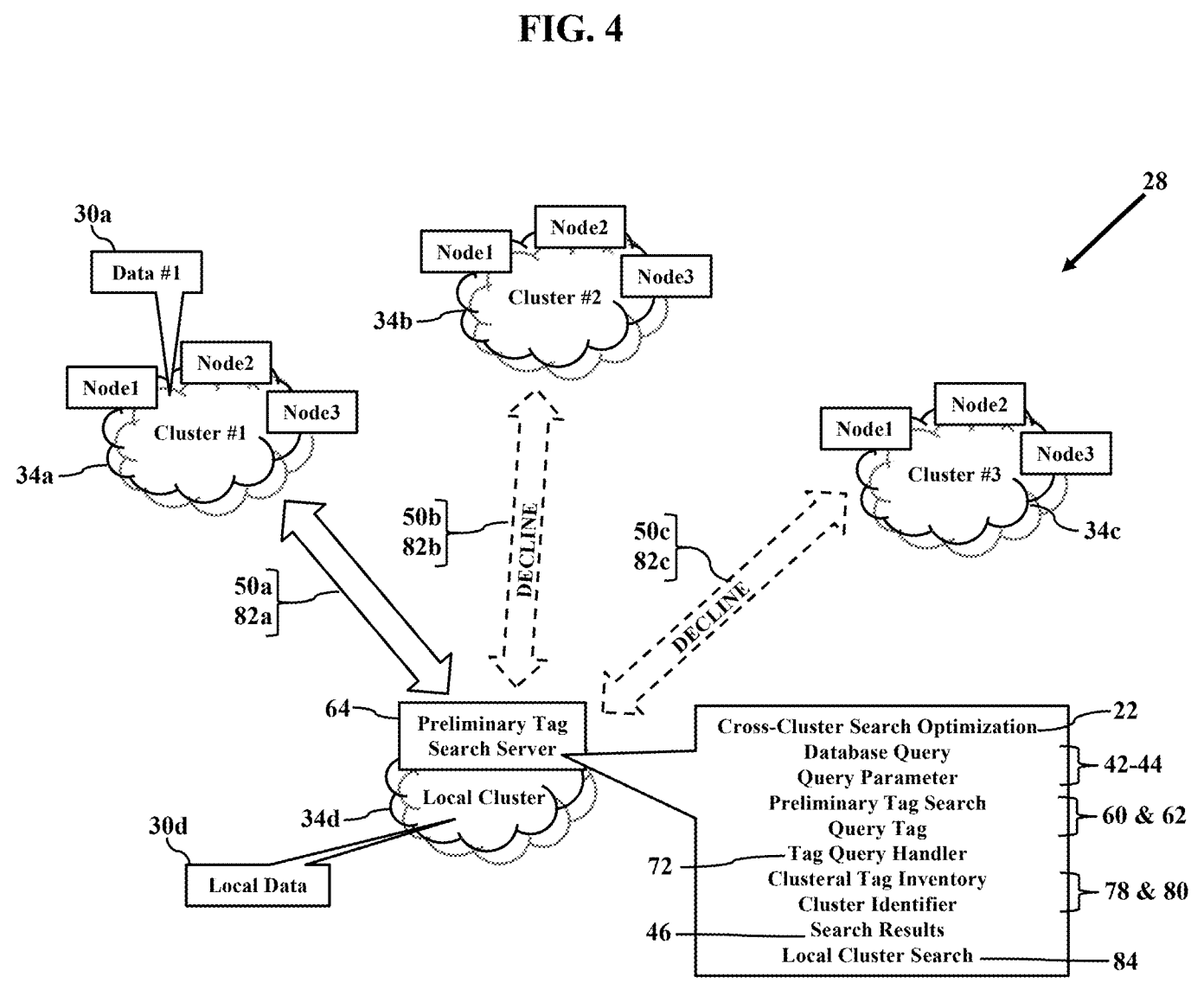

Cluster #3

Node2    Node3

Node1

34c

Cluster #2

Node2    Node3

Node1

34b

Cluster #1

Node2    Node3

Node1

34a

Data #1

30a 50c
82c

DECLINE 50b
82b

DECLINE 50a
82a

Preliminary Tag
Search Server

64

Local Cluster

34d

Local Data

30d

Cross-Cluster Search Optimization — 22
Database Query
Query Parameter — 42-44
Preliminary Tag Search
Query Tag — 60 & 62
Tag Query Handler
Clusteral Tag Inventory — 78 & 80
Cluster Identifier
Search Results — 84
Local Cluster Search

Figure 5:
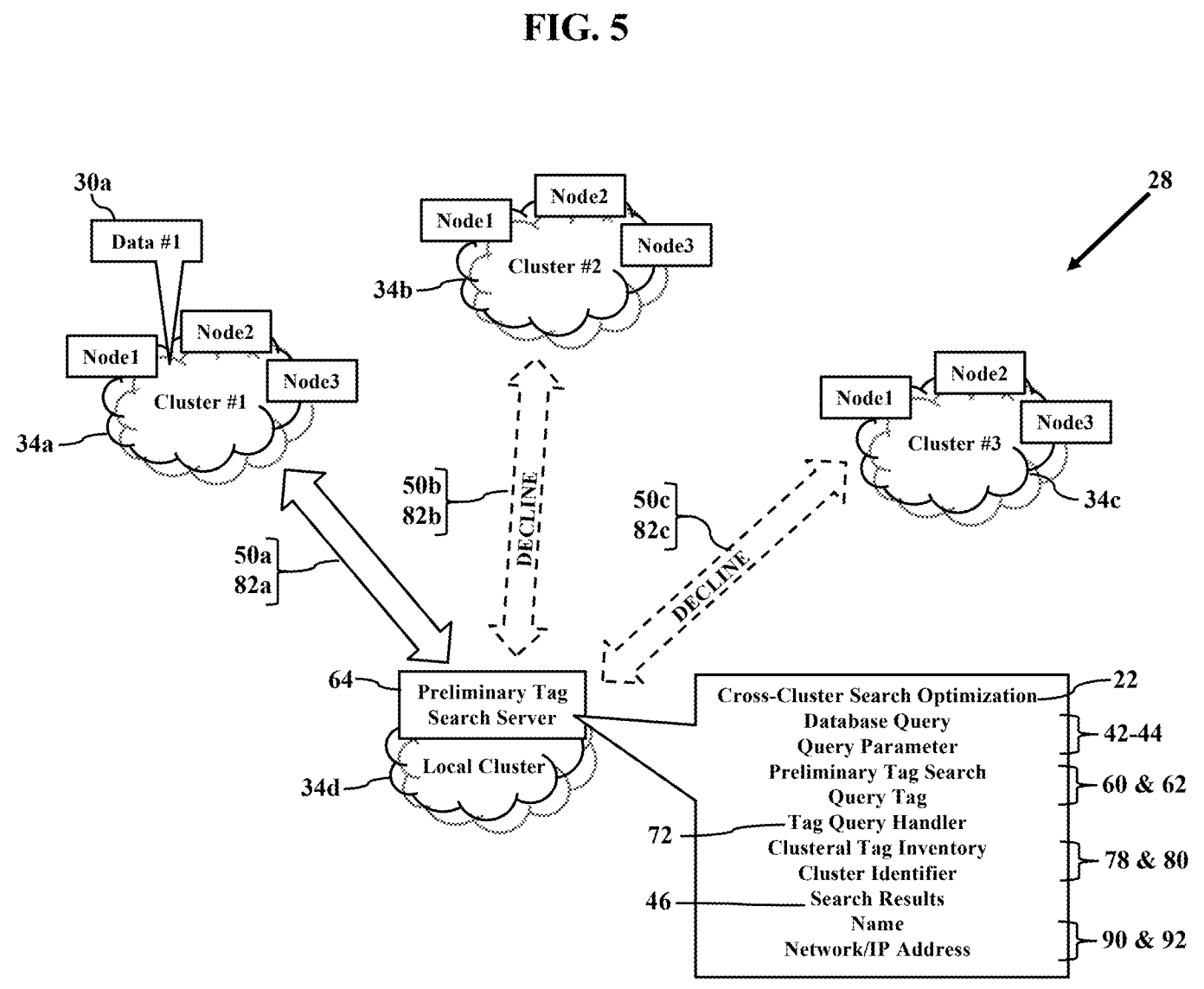

Node3
Node2
Node1
Cluster #3
34c

Node3
Node2
Node1
Cluster #2
34b

Node3
Node2
Node1
Data #1
Cluster #1
30a
34a

DECLINE
50c
82c

DECLINE
50b
82b 50a
82a

Preliminary Tag
Search Server
Local Cluster
64
34d

Cross-Cluster Search Optimization    22
Database Query
Query Parameter    42-44
Preliminary Tag Search
Query Tag    60 & 62
Tag Query Handler
Clusteral Tag Inventory    78 & 80
Cluster Identifier
Search Results
Name    90 & 92
Network/IP Address

Figure 6:
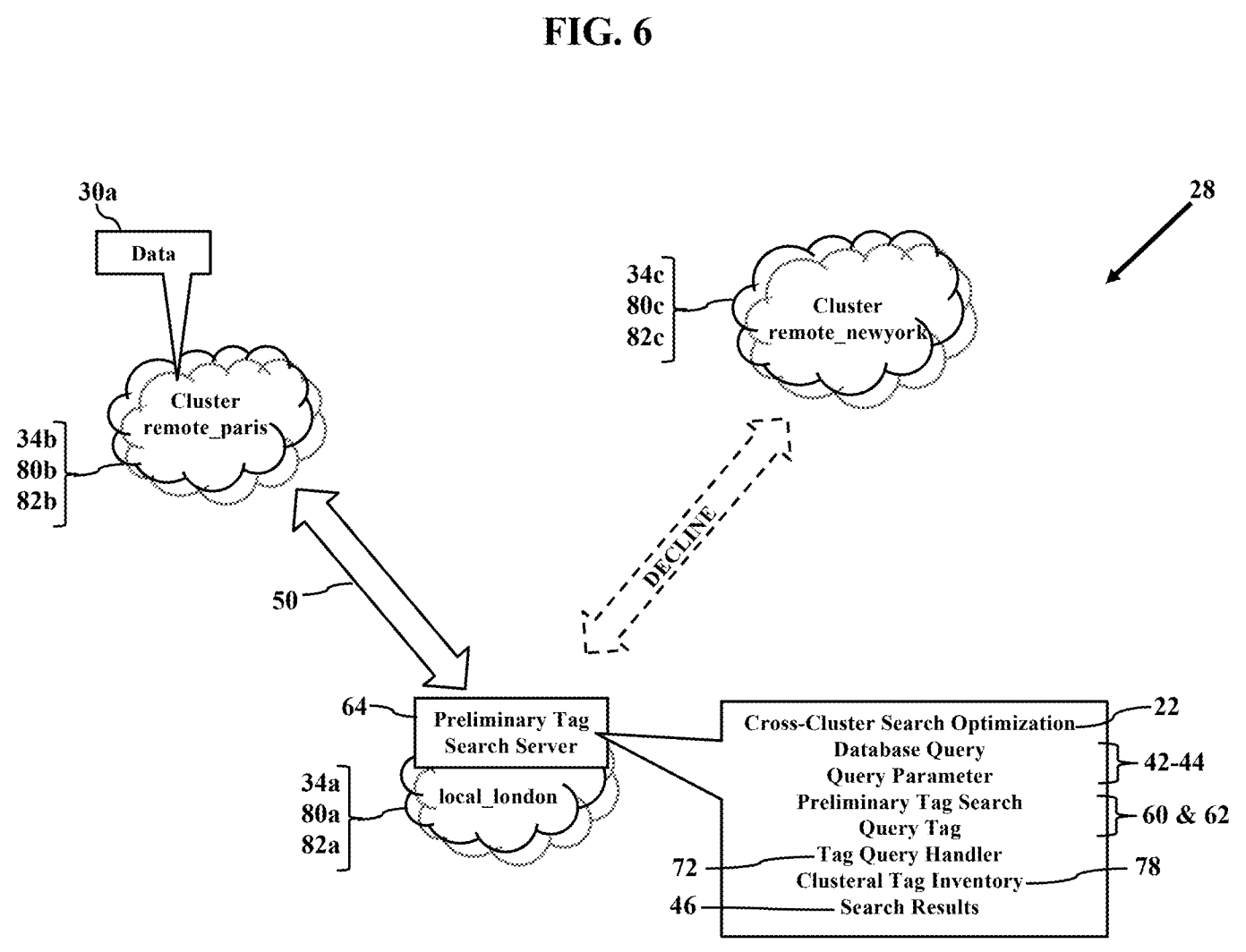

Cluster
remote_newyork 34c
80c
82c

DECLINE

22 — Cross-Cluster Search Optimization
42-44 — Database Query
       — Query Parameter
       — Preliminary Tag Search
60 & 62 — Query Tag
78 — Tag Query Handler
    — Clusteral Tag Inventory
    — Search Results 72
46

Preliminary Tag
Search Server local_london

64

34a
80a
82a

50

Cluster
remote_paris

Data

Figure 7:
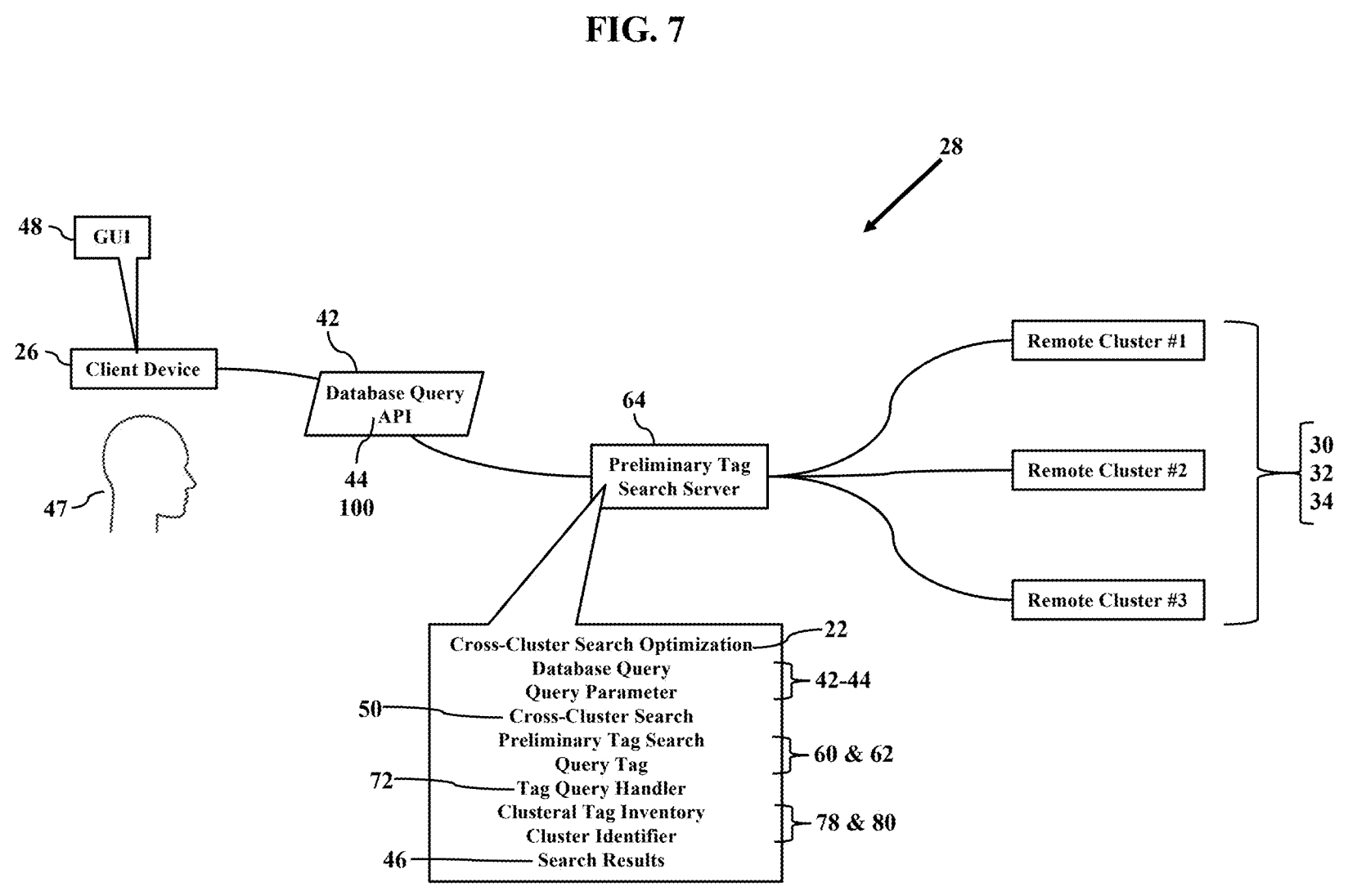

Remote Cluster #1

Remote Cluster #2

Remote Cluster #3

64

Preliminary Tag
Search Server

22

42-44

60 & 62

78 & 80

Cross-Cluster Search Optimization
Database Query
Query Parameter
Cross-Cluster Search
Preliminary Tag Search
Query Tag
Tag Query Handler
Clusteral Tag Inventory
Cluster Identifier
Search Results

50

72

46

42

Database Query
API 44
100

48

GUI

26

Client Device

Figure 8:
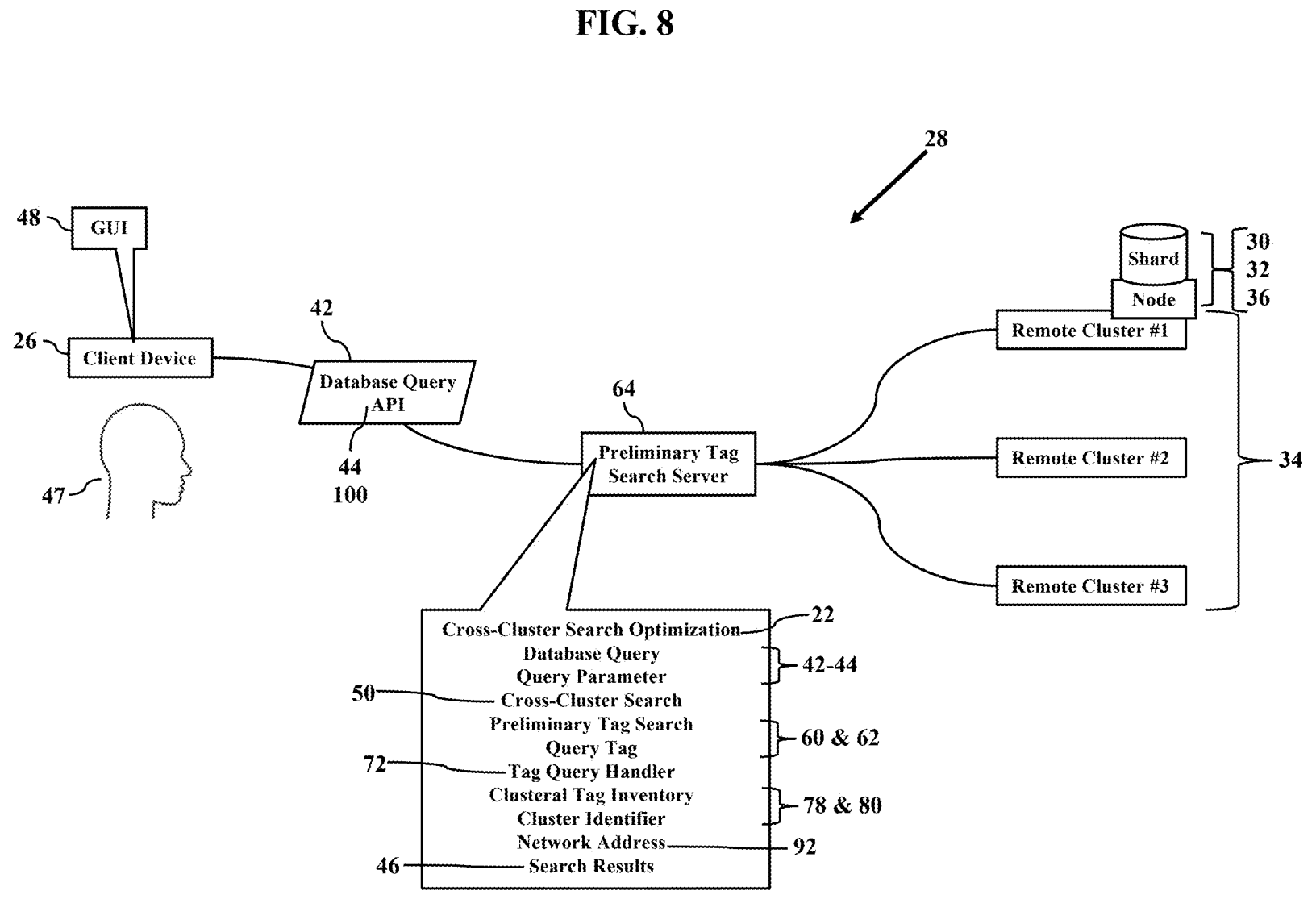

64   Preliminary Tag Search Server 30
32
36

Shard

Node

34

Remote Cluster #1

Remote Cluster #2

Remote Cluster #3

22   Cross-Cluster Search Optimization 42-44   Database Query
    Query Parameter 60 & 62   Cross-Cluster Search
    Preliminary Tag Search
    Query Tag 78 & 80   Tag Query Handler
    Clusteral Tag Inventory
    Cluster Identifier 92   Network Address Search Results

50

72

46

42   Database Query API 44
100

48   GUI

26   Client Device

28

{ 34
{ 38

{ 30
{ 36

{ 24
{ 32
{ 130
{ 132

38
Distributed Database Service
Distributed Database — 120
Mapreduce Database Framework
Mapper Phase
Reducer Phase
Electronic Data — 30
Coordinator Role
Worker Role — 126 & 128

122 & 124

28

Node

Database Shard

40

Cross-Cluster Search Optimization — 22
Database Query
Query Parameter — 42-44
Cross-Cluster Search
Preliminary Tag Search
Query Tag — 60 & 62
Tag Query Handler
Clusteral Tag Inventory — 78 & 80
Cluster Identifier
Search Results

Figure 15:
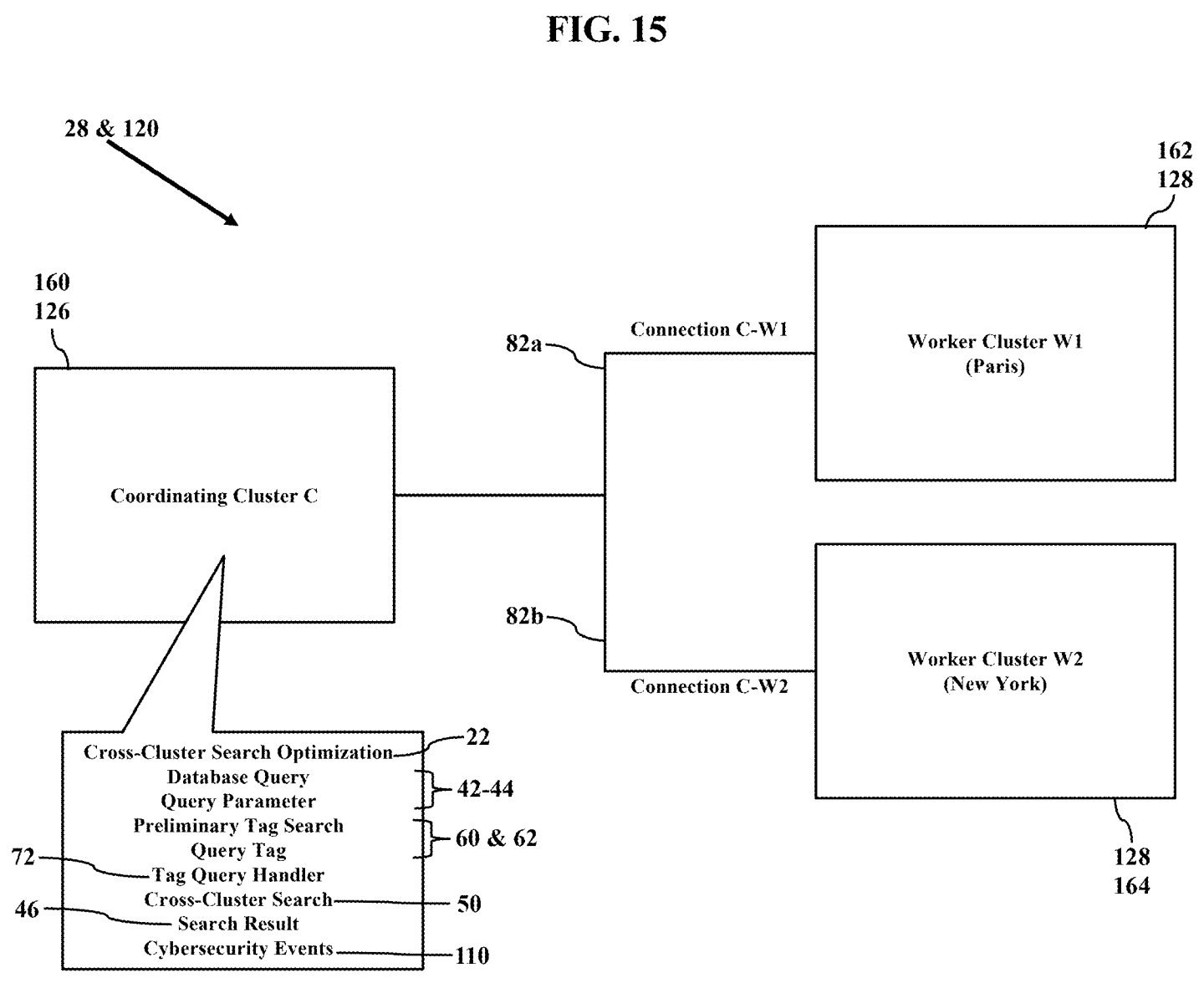

Worker Cluster W1
(Paris)

162
128

Worker Cluster W2
(New York)

128
164

Connection C-W1

82a

Connection C-W2

82b

Coordinating Cluster C 160
126

Cross-Cluster Search Optimization — 22
Database Query ⎤
Query Parameter ⎦ 42–44
Preliminary Tag Search ⎤
Query Tag ⎦ 60 & 62
Tag Query Handler — 72
Cross-Cluster Search
Search Result — 46
Cybersecurity Events — 110

Figure 18:
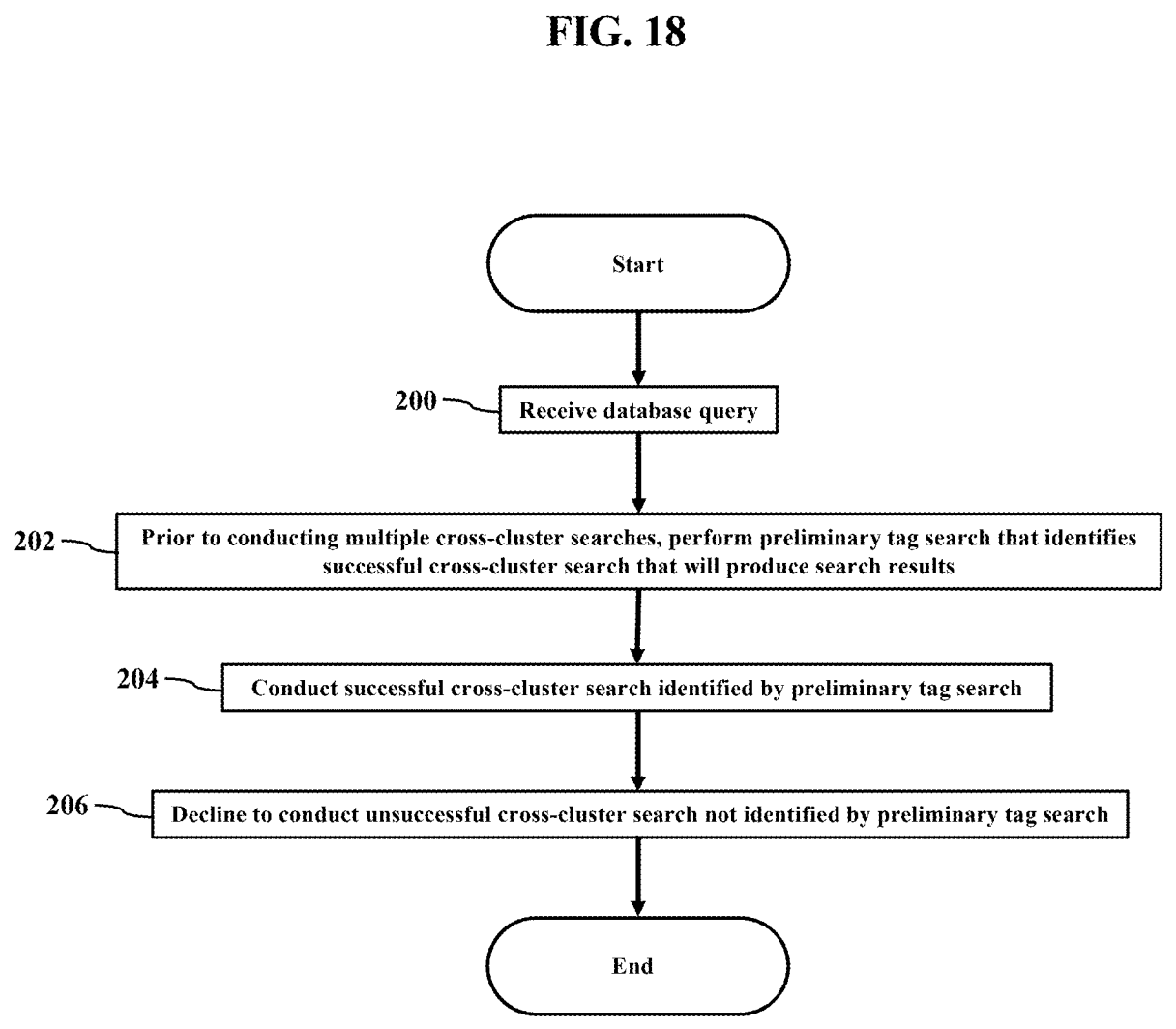

Start

Receive database query — 200

Prior to conducting multiple cross-cluster searches, perform preliminary tag search that identifies successful cross-cluster search that will produce search results — 202

Conduct successful cross-cluster search identified by preliminary tag search — 204

Decline to conduct unsuccessful cross-cluster search not identified by preliminary tag search — 206

End

FIG. 19

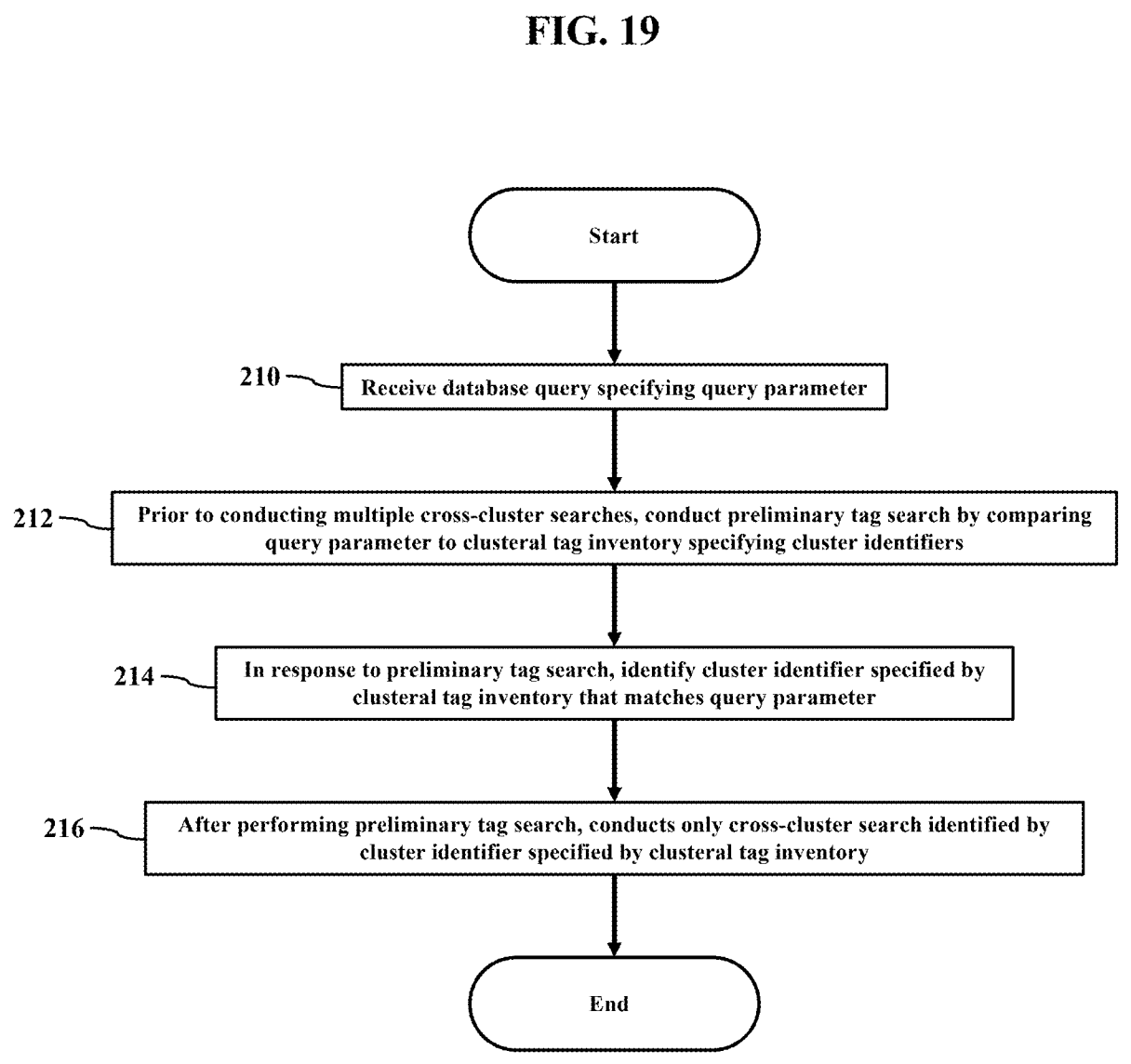

Start

210 — Receive database query specifying query parameter

212 — Prior to conducting multiple cross-cluster searches, conduct preliminary tag search by comparing query parameter to clusteral tag inventory specifying cluster identifiers 214 — In response to preliminary tag search, identify cluster identifier specified by clusteral tag inventory that matches query parameter 216 — After performing preliminary tag search, conducts only cross-cluster search identified by cluster identifier specified by clusteral tag inventory End

CROSS-CLUSTER SEARCH OPTIMIZATION

BACKGROUND

The subject matter described herein generally relates to computers and to database structures and, more particularly, the subject matter relates to information retrieval and to database structures.

Searching data is hardware intensive. As cloud computing grows in usage, computer databases have grown exceptionally large. It is common, for example, for a cloud-distributed database to process and store ten million (10,000,000) messages per second. Each day, then, cloud-distributed databases store massive amounts of data that consume petabytes of memory storage. Because these exceptionally large databases must be searched, data lookups require much time and hardware resources.

SUMMARY

A new and elegant preliminary tag search greatly improves computer functioning. Today's cloud service providers maintain large, distributed datasets stored by multiple clusters having many nodes. When the large, distributed dataset must be searched to obtain search results, many cross-cluster searches can be performed. Some of the cross-cluster searches are successful and return search results. Other cross-cluster searches, though, are unsuccessful and return no search results. These unsuccessful cross-cluster searches still require time and consume much hardware resources, network bandwidth, and electrical energy. The preliminary tag search, though, eliminates unfruitful and wasteful cross-cluster searches. The preliminary tag search, for example, may identify only those cross-cluster searches that will generate successful, positive search results. The preliminary tag search, conversely, may also reveal which cross-cluster searches would generate no search results and merely waste resources. Prior to conducting cross-cluster searches, then, the distributed database service may first perform the preliminary tag search to identify successful cross-cluster searches. The distributed database service may perform only the successful cross-cluster searches revealed by the preliminary tag search. The distributed database service may also decline or ignore unsuccessful and wasteful cross-cluster searches, as revealed by the preliminary tag search.

BRIEF DESCRIPTION OF THE SEVERAL VIEWS OF THE DRAWINGS

The features, aspects, and advantages of cross-cluster search optimization are understood when the following Detailed Description is read with reference to the accompanying drawings, wherein:

FIGS. 1-4 illustrate some examples of a cloud service implementing cross-cluster search optimization;

FIGS. 5-6 illustrate some examples of a clusteral tag inventory;

FIG. 7 illustrates some examples using application programming interfaces;

FIGS. 8-9 illustrate more examples of the clusteral tag inventory;

FIGS. 10-11 illustrate examples of the clusteral tag inventory implemented in a mapreduce database framework;

FIGS. 13-17 illustrate examples of cloud processing;

FIGS. 18-20 illustrate examples of different method or operations that improve computer functioning.

DETAILED DESCRIPTION

Figure 1:
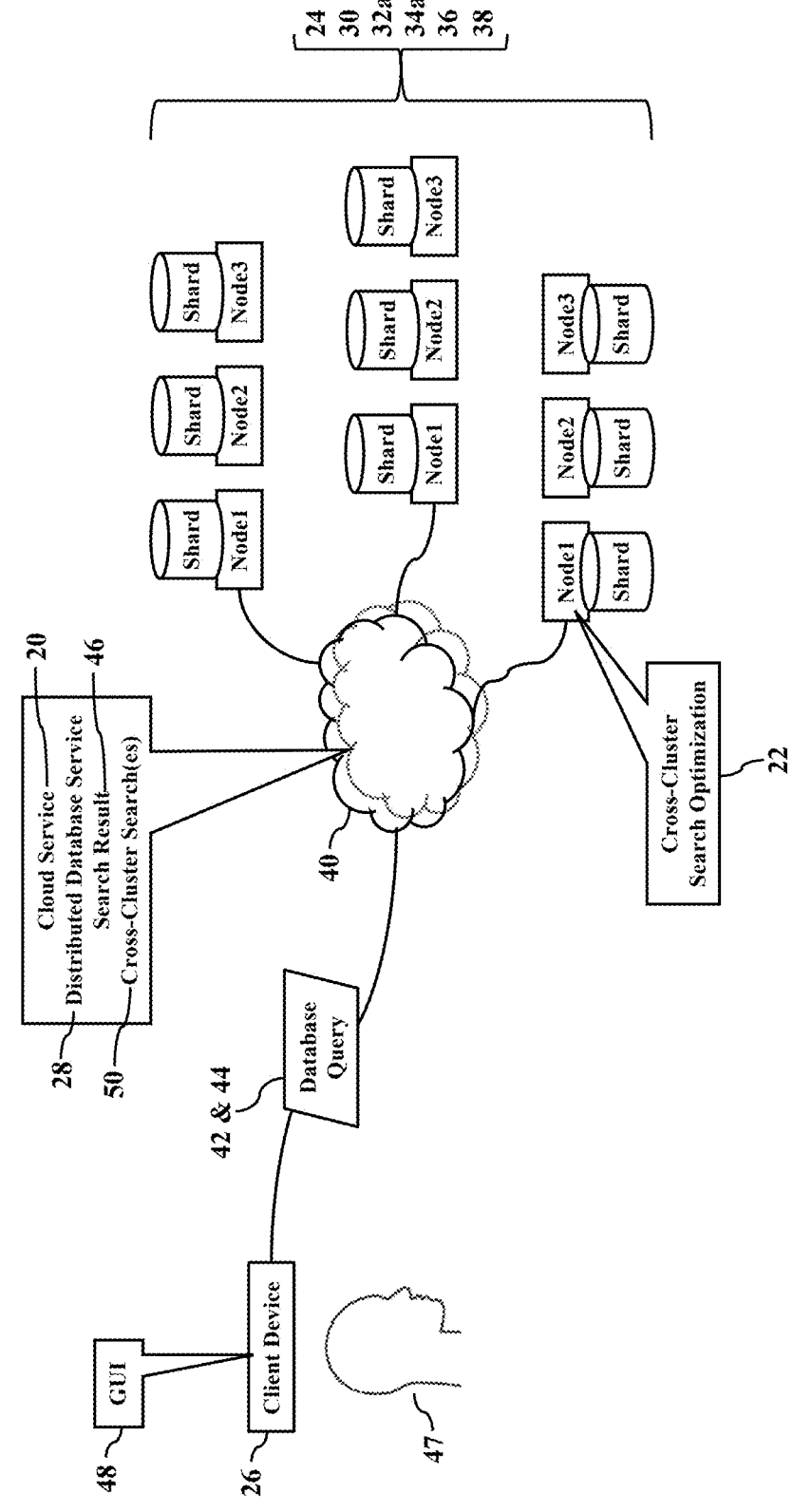

Searches of computer databases require time and resources. A computer database is stored within a server or other computer system. The computer database stores millions, billions, or even more electronic records (such as movies, music, messages, documents, or other electronic files). Whatever the electronic records, the computer database may be very large, especially in cloud computing environments. Because databases are large, these large databases burden hardware processors and memory devices. Large databases are slow to search, as the hardware processor and the memory device require more operations and more time to sift through the millions/billions of data records. Large databases also require more electrical power, as the hardware processor and memory device consume more electricity. Large databases also burden communications networks, as large databases can cause latency delays between computer systems. As a general rule, then, as databases grow in size, their costs also grow.

Some examples relate to cross-cluster search optimization. Because large databases store massive amounts of data, many large databases may have hundreds, or even thousands, of distributed computers, and each computer may store terrabytes or more of data. Indeed, NETFLIX®, AMAZON®, GOOGLE®, HULU®, and many other cloud services maintain very large distributed databases that collect massive amounts of data. When the data is searched, it's common for cloud services to search hundreds or even thousands of servers. Many of these servers, though, do not store data that is relevant to a database query. Cloud services thus waste much time, resources, and electrical energy searching servers that yield no search results. The cross-cluster search optimization, though, eliminates unsuccessful cross-cluster searches that produce no search results. The cross-cluster search optimization tracks which cluster stores what data. The cross-cluster search optimization, as a very simple example, logs which computing cluster (e.g., a group of servers) stores movie files. The cross-cluster search optimization, as more simple examples, tracks which computing clusters store music files, digital photos, emails, text messages, and calendar appointments. Indeed, the cross-cluster search optimization tracks the network locations of other digital, electronic content. So, when the cloud service receives a database query, the cross-cluster search optimization precisely identifies which computing cluster stores the search results. The cloud service may thus conduct a targeted, cross-cluster search to obtain the search results. The cloud service need not conduct other cross-cluster searches that return no search results and that merely waste time, resources, and electrical energy. The cross-cluster search optimization provides faster search results while using less hardware resources and less electrical power.

Some examples further relate to preliminary tag searches. Because the cross-cluster search optimization accurately identifies distributed storage locations, a preliminary tag search further improves computer functioning. The cloud service often receives a database query that specifies a query parameter. The cloud service may then preprocess the database query to determine which computing cluster, and even which nodal member, stores the data that is relevant to answering the database query. For example, prior to conducting a cross-cluster search, the cloud service may first conduct the preliminary tag search. The preliminary tag search compares the query parameter (specified by the database query) to a tag inventory stored by the cloud service. Because the cloud service stores great quantities of digital data, the cloud service may add descriptive tags as the data is stored. One such descriptive tag, for example, is the cluster storage location (such as an IP address). The tag inventory may thus comprehensively track which computing clusters store movie files, music files, and other digital, electronic content. So, if the query parameter is matched to the tag inventory, then the cloud service may particularly identify the corresponding cluster storage location. The cloud service may thus quickly and efficiently query the cluster that stores the digital, electronic content matching the query parameter. The cloud service need not conduct multiple, fruitless cross-cluster searches that return no search results. The preliminary tag search provides faster search results while using less hardware resources and less electrical power.

Cross-cluster search optimization will now be described more fully hereinafter with reference to the accompanying drawings. The concepts and schemes for cross-cluster search optimization, however, may be embodied and implemented in many different forms and should not be construed as limited to the examples set forth herein. These examples are provided so that this disclosure will be thorough and complete and fully convey cross-cluster search optimization to those of ordinary skill in the art. Moreover, all the examples of cross-cluster search optimization are intended to encompass both structural and functional equivalents thereof. Additionally, it is intended that such equivalents include both currently known equivalents as well as equivalents developed in the future (i.e., any elements developed that perform the same function, regardless of structure).

FIGS. 1-4 illustrate some examples of a cloud service 20 implementing cross-cluster search optimization 22. One or more computer systems 24 provide at least a portion of the cloud service 20 to a client device 26. While the computer system(s) 24 may provide a wide variety of cloud services 20 to the client device 26, FIG. 1 illustrates a cloud-based distributed database service 28. That is, the distributed database service 28 may be offered or provided by a service provider, and the distributed database service 28 distributes and stores electronic data 30 among computing nodes 32 (perhaps associated with different computing clusters 34). Each computing node 32 is also an example of the computer system 24, and each computing node 32 locally stores at least a portion or shard 36 of a distributed database 38. Because the distributed database 38 may be very large and store many petabytes (e.g., 250 bytes or millions of gigabytes) of the electronic data 30, the distributed database service 28 may have many, perhaps even hundreds, of the computing nodes 32 associated with many different clusters 34. Such a large number of the computing nodes 32, though, is too difficult to illustrate. For simplicity, then, FIG. 1 only illustrates three (3) clusters (illustrated as reference numerals 34a, 34b, and 34c). Each cluster 34a-c also has three (3) computing nodes (illustrated as reference numerals 32a-c). The computing nodes 32 and clusters may communicate via a cloud computing networking environment 40.

The cloud-based distributed database service 28 provides search results 46. Because the distributed database service 28 may store days, months, and even years of the electronic data 30, the client device 26 may submit a database query 42. The database query 42 requests a search of the distributed database 38 according to a query parameter 44. A human user (illustrated as reference numeral 47) of the client device 26, for example, may wish to search the distributed database 38 for historical data 30 that matches/contains the query parameter 44. The human user 47 may then type/compose the query parameter 44 and enter the query parameter 44 into a graphical user interface (or GUI) 48. The client device 26 generates the database query 42 representing the user's query parameter 44, and the client device 26 sends the database query 42 to a network address (e.g., IP address) associated with the distributed database service 28.

Conventional database search schemes would then forward or send the database query 42 to each cluster 34a-c. Conventional database search schemes, in other words, would conduct many cross-cluster searches among the clusters to find the search results 46. Each cluster 34a-c would also instruct its member nodes 32a-c to search their respective local shards 36 according to the query parameter 44 specified by the database query 42. As the reader likely understands, then, these conventional, distributed searches of large databases can take many seconds to accomplish. Indeed, as the distributed database 38 may have hundreds of the computing nodes 32 and store many petabytes of the electronic data 30, a search time for answering the database query 42 may be excessive and require many seconds to accomplish. Indeed, conventional, distributed searches of large databases can result in query timeouts and/or unfavorable user experiences. Moreover, conventional, distributed searches of large databases add much network traffic and network latency, thus further slowing query responses and wasting electrical energy.

The cloud-based distributed database service 28, instead, implements the cross-cluster search optimization 22. The cross-cluster search optimization 22 identifies which of the many clusters 34 store the search results 46. The cross-cluster search optimization 22 also identifies which of the many clusters 34 does not store the search results 46. So, prior to performing intensive and expensive multiple cross-cluster searches 50 among the clusters 34, the cross-cluster search optimization 22 identifies a priori which ones of the multiple cross-cluster searches 50 will successfully produce or yield the search results 46. The cloud-based distributed database service 28 may thus only conduct those successful cross-cluster searches 50 that will successfully produce or yield the search results 46. The cloud-based distributed database service 28 may ignore, skip, or fail to conduct unsuccessful cross-cluster searches 50 that will not produce nor yield the search results 46. The cloud-based distributed database service 28, in other words, need not waste time, resources, and electrical energy conducting fruitless, unsuccessful cross-cluster searches 50.

Figure 2:
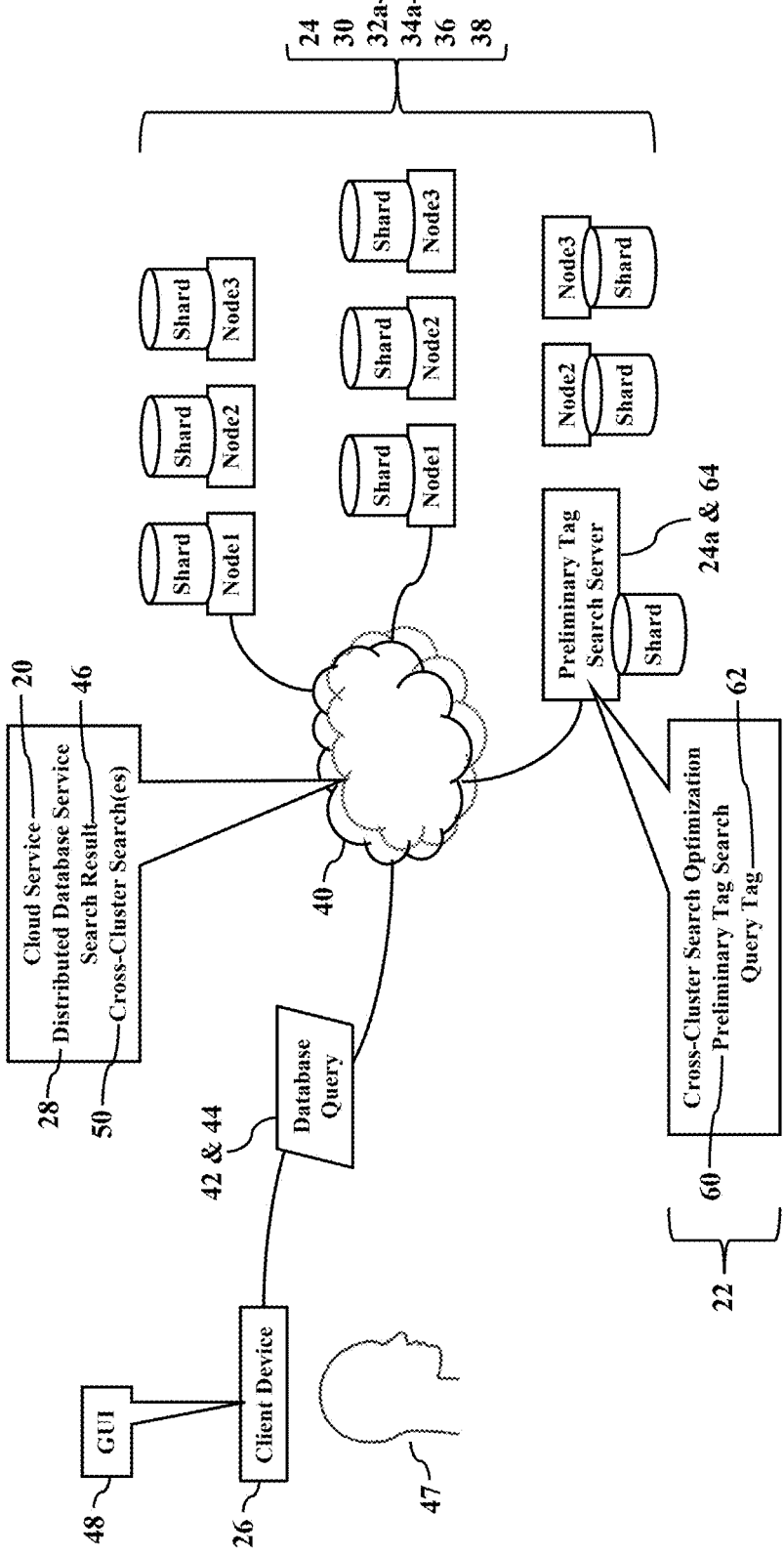

FIG. 2 further illustrates the cross-cluster search optimization 22. The distributed database service 28 optimizes the the number of the cross-cluster search(es) 50 by performing a preliminary tag search 60 using one or more query tags 62. When the distributed database service 28 receives the database query 42, nodal members of the distributed database service 28 may forward the database query 42 to a service component that performs the preliminary tag search 60. FIG. 2, for example, illustrates the computer system 24a performing the preliminary tag search 60. FIG. 2 illustrates the computer system 24a as a preliminary tag search server 64, but the computer system 24a may be another processor-controlled device (as later paragraphs will explain). The preliminary tag search 60, when successful, greatly reduces the number of clusters 34 that must be searched via the cross-cluster search(es) 50 to answer the database query 42.

As FIG. 3 illustrates, the preliminary tag search 60 is an elegant and efficient preprocessing step. When the preliminary tag search server 64 receives the database query 42, the preliminary tag search server 64 is programmed to execute the preliminary tag search 60. FIG. 3 illustrates the preliminary tag search server 64 as a rack server that is commonly found in server rooms. The preliminary tag search server 64 stores and executes an operating system 70. The preliminary tag search server 64 also stores a tag query handler 72 in a memory device 74. The tag query handler 72 is one of many software applications stored in the memory device 74. The preliminary tag search server 64 has a hardware processor with cores 76 (illustrated as "CPU") that reads and executes the operating system 70 and the tag query handler 72. The tag query handler 72 has programming code or instructions that cause the preliminary tag search server 64 to perform operations, such as reading the database query 42 and performing the preliminary tag search 60 prior to conducting one or more of the cross-cluster searches 50. The tag query handler 72, for example, instructs the preliminary tag search server 64 to perform the preliminary tag search 60 by comparing the query parameter 44 to a clusteral tag inventory 78. The clusteral tag inventory 78 identifies different query tags 62 and their corresponding clusteral identifiers 80. So, if the query parameter 44 matches one or more of the query tags 62 in the clusteral tag inventory 78, then the tag query handler 72 instructs the hardware processor/cores 76 to read and/or to retrieve the corresponding cluster identifier 80. The cluster identifier 80, in simple words, identifies the cluster 34 (illustrated in FIGS. 1-2) that stores the electronic data 30 associated with the same query tag 62 matching the query parameter 44. So, to answer the database query 42, the distributed database service 28 need only query the cluster(s) 34 identified by the clusteral tag inventory 78. The distributed database service 28 has no need, nor reason, to conduct the cross-cluster search 50 of other clusters 34 unmatched to the clusteral tag inventory 78. The other clusters 34 not matching the query tag 62 would not contain the electronic data 30 matching the query parameter 44. The distributed database service 28 may thus immediately decline, or skip, searches of the clusters 34 not identified by the query tag 62. Database searches of unmatching clusters 34, in other words, may be fruitless and yield no search results.

As FIG. 4 illustrates, the preliminary tag search 60 greatly simplifies the cross-cluster searches 50. The clusteral tag inventory 78 tracks which clusters 34 store the electronic data 30 associated with the corresponding query tag 62. The distributed database service 28 may build and maintain the clusteral tag inventory 78 as a comprehensive cloud service resource. The clusteral tag inventory 78 reveals which cluster 34 stores the electronic data 30 associated with the corresponding query tag 62. The clusteral tag inventory 78 may additionally or alternatively reveal which cluster 34 does not store the electronic data 30 associated with the corresponding query tag 62. The distributed database service 28 (such as the preliminary tag search server 64) may thus quickly read and compare the query parameter 44 (referenced by the database query 42) to the entries specified by clusteral tag inventory 78. The clusteral tag inventory 78 identifies which one, or more, cluster(s) 34 store, and/or do not store, the electronic data 30 associated with the corresponding query tag 62.

FIG. 4 illustrates a simple example. Suppose the clusteral tag inventory 78 specifies that remote cluster 34a stores the electronic data 30a tagged to match the query parameter 44. The clusteral tag inventory 78, in other words, identifies remote cluster 34a as storing the electronic data 30a that will produce or yield the search results 46. The preliminary tag search server 64 may thus conduct or perform the cross-cluster search 50a with remote cluster 34a. Suppose also that the cluster identifier 80 specifies an intra-cluster network connection 82a that is made/established by the preliminary tag search server 64 to retrieve relevant search results 46. The preliminary tag search server 64 may thus conducts the cross-cluster search 50 according to the intra-cluster network connection 82a specified by the clusteral tag inventory 78. The preliminary tag search 60, however, may determine that other remote clusters (such as 34b and 34c) are not matched to the clusteral tag inventory 78 and do not store electronic data 30 associated with the corresponding query tag 62. The preliminary tag search server 64 may thus quickly and simply determine that additional cross-cluster searches (illustrated as 50b and 50c) of non-matching remote clusters 34b-c would be futile and waste time and resources. The preliminary tag search server 64 need only conduct the cross-cluster search 50a of the remote cluster 34a, as specified by the clusteral tag inventory 78.

The preliminary tag search 60 may also specify a local search. The clusteral tag inventory 78 may also specify the local cluster 34d as storing tagged electronic data 30. When the preliminary tag search server 64 compares the query parameter 44 to the clusteral tag inventory 78, the cluster identifier 80 may identify the local cluster 34d associated with the preliminary tag search server 64. The clusteral tag inventory 78, in other words, may indicate that the local cluster 34d, associated with the preliminary tag search server 64, also stores electronic data 30d associated with the corresponding query tag 62. Because the preliminary tag search server 64 may itself be associated or affiliated with local cluster 34d, the preliminary tag search server 64 may conduct or order up a local cluster search 84 to retrieve the search results 46. The preliminary tag search server 64 may thus conduct the local cluster search 84 and/or the cross-cluster search 50a to retrieve the search results 46.

FIGS. 5-6 illustrate more examples of the clusteral tag inventory 78. When the preliminary tag search server 64 receives the database query 42, the tag query handler 72 instructs or causes the preliminary tag search server 64 to compare the query parameter 44 to the clusteral tag inventory 78. When the query parameter 44 matches the query tag 62 in the clusteral tag inventory 78, then the tag query handler 72 identifies the corresponding cluster identifier 80. In these examples, let's suppose that the cluster identifier 80 specifies a cluster name 90 (such as cluster_name) and a network address 92 (such as an Internet Protocol address). The cluster name 90 and the network address 92 identify the cluster 34a that stores the electronic data 30a associated with the query tag 62 matching the query parameter 44. So, in order to answer the database query 42, the tag query handler 72 need only query the cluster 34a identified by the cluster name 90 and the network address 92. Other clusters (such as clusters 34b and 34c), not identified by the clusteral tag inventory 78, may not store the search results 46 matching the query parameter 44. The tag query handler 72 thus quickly and easily determines which cluster/clusters (such as 34a) stores/store positive/yes/successful search results 46. The tag query handler 72 also quickly and easily determines which cluster/clusters (34b-c) store/store no/negative/unsuccessful search results.

FIG. 5 also illustrates the reduced query scheme. The clusteral tag inventory 78 reveals which cluster(s) (such as 34a) store the search results 46 that satisfy the database query 42. Once the successful cluster 34a is identified by querying the clusteral tag inventory 78, the tag query handler 72 may limit its query scheme. That is, even though the distributed database service 28 may have network connections 82 to many different remote clusters (such as 34*a-c*) storing the electronic data 30*a-c*, the tag query handler 72 uses the clusteral tag inventory 78 to narrow a scope of the database search. The clusteral tag inventory 78 identifies which remote clusters 34 store, and/or which remote clusters 34 do not store, the electronic data 30 of interest, according to the query tag 62. The tag query handler 72 need only query the cluster(s) 34 identified by the clusteral tag inventory 78 as associated with the query tag 62. As FIG. 5 illustrates, for example, the tag query handler 72 may conduct the cross-cluster search 50*a* and merely query according to the cluster name 90 and/or the network address 92 (established via the network connection 82*a*) identified by the clusteral tag inventory 78. The tag query handler 72, however, may decline to query, or skip, other clusters (such as 34*b-c*) not storing the electronic data 30 of interest, as identified by the clusteral tag inventory 78. The tag query handler 72 thus uses the clusteral tag inventory 78 to eliminate unsuccessful cross-cluster searches (such as 50*b* and 40*c*) that would produce none of the search results 46. Because the unsuccessful cross-cluster searches 50*b* and 50*c* are eliminated, the number of the cross-cluster searches 50 is reduced, perhaps even substantially reduced. The tag query handler 72 may thus receive the relevant/successful database search result 46 sent from, or otherwise associated with, the cluster name 90 and/or the network address 92 identified by the clusteral tag inventory 78. The tag query handler 72 may then send the database search result 46 as a query response to the client device 26 (illustrated in FIGS. 1-2). The client device 26 may then process the query response (such as for display via the GUI 48 illustrated in FIGS. 1-2).

The preliminary tag search 60 greatly improves computer functioning. The preliminary tag search 60 substantially reduces the scope and number of the cross-cluster searches 50. Conventional database search schemes would cross-cluster query each remote cluster to obtain search results. The conventional database search schemes may thus require many seconds to perform, and the conventional database search schemes may require much hardware and software resources. The conventional database search schemes also add network packet traffic and consume much electrical energy. As some (or many) clusters may not store search results, conventional database search schemes waste time, waste hardware resources, waste electrical energy, and fruitlessly increase costs. The preliminary tag search 60, however, generates faster search results 46 using less hardware resources, less electrical energy, and less costs. The preliminary tag search 60 is performed prior to conducting one or more of the cross-cluster searches 50. The preliminary tag search 60 quickly and simply identifies which local and/or remote clusters 34 will, and/or will not, successfully produce the search results 46. The distributed database service 28 need not waste time, energy, and resources unsuccessfully searching clusters having no search results. The preliminary tag search 60, for example, allows the distributed database service 28 to only conduct successful cross-cluster searches 50 that are a priori known to store fruitful search results 46. The preliminary tag search 60, as another example, allows the distributed database service 28 to determine which cross-cluster searches 50 will return fruitless/no results 46. The preliminary tag search 60 allows the distributed database service 28 (such as the preliminary tag search server 64) to retrieve quicker database search results 46 using less read/write operations, less processor and memory cycles, and less electrical energy. The preliminary tag search 60 also allows the preliminary tag search server 64 to retrieve the database search results 46 using less network interface resources (such as less packet generation, less packet sends, and less packet reads). The preliminary tag search 60 thus greatly improves computer functioning.

FIG. 6 illustrates some topological examples of regional, multi-cluster searches. In these examples, the preliminary tag search server 64 has network access to the local cluster 34*a* and to remote clusters 34*b* and 34*c*. The preliminary tag search server 64 has the network connection 82*a* to the local cluster 34*a*. Let's assume that the local cluster 34*a* is geographically associated with London (e.g., "local_london" as the cluster identifier 80*a*). The preliminary tag search server 64 may also establish the network connection 82*b* to "remote paris" (cluster identifier 80*b*) and the network connection 82*c* to "remote_newyork" (cluster identifier 80*c*). When the distributed database service 28 (such as the preliminary tag search server 64) receives the database query 42, the tag query handler 72 instructs or causes the preliminary tag search server 64 to compare the query parameter 44 to the clusteral tag inventory 78. If the query parameter 44 matches one or more query tags 62 in the clusteral tag inventory 78, then the tag query handler 72 causes the preliminary tag search server 64 to query the corresponding cluster identifier 80. If the query parameter 44 fails to match the query tag 62 in the clusteral tag inventory 78, then the tag query handler 72 declines or fails to query the corresponding cluster identifier 80.

The clusteral tag inventory 78 identifies the search scheme. Let's assume the query tag 62 has a key/value definition or specification. Each network connection 82*a-c*, in other words, has a single, corresponding query tag 62 configured with the key "#clusteridentity" and the respective values of "remote-paris", "remote-newyork," and "local-london." The clusteral tag inventory 78 thus tracks the electronic data 30 according to the key "#clusteridentity" (as defined for all network connections 82*a-c*), but the electronic data 30 will have different values depending on where the electronic data 30 is stored (such as cluster 34*a*, 34*b*, or 34*c*) and/or from where the search result 46 arrived.

The clusteral tag inventory 78 limits the database search scope. The query tags 62 are predefined before conducting the local cluster search 84 and the cross-cluster search 50. When the preliminary tag search server 64 receives the database query 42, the preliminary tag search server 64 may conduct the preliminary tag search 60 before querying the cluster 34*a-c*. The preliminary tag search server 64 (executing the tag query handler 72) evaluates the query parameter 44 against the query tags 62 in the clusteral tag inventory 78. The preliminary tag search 60, as a mere database lookup, requires much less time, hardware resources, and electrical energy than querying the clusters 34*a-c*. The preliminary tag search 60 identifies whether the local cluster search 84, and/or which cross-cluster search 50, will achieve successful/unsuccessful search results 46. The preliminary tag search 60 determines, for each network connection 82, whether or not the remote cluster 34 at the end of that network connection 82 even needs to be queried for the search results 46. As a simple example, let's assume the database query 42 specifies the query parameter 44 as "#clusteridentity!=remote-newyork" (this query string means to filter away all search results 46 where the #clusteridentity tag is different from remote-newyork). The preliminary tag search 60 thus determines, before even seeing a single search result, that no search results from the network connection 82*c* with the clusteridentity tag with value "remote-newyork" will be relevant to the search result 46. The preliminary tag search 60 thus reveals that no query or network connection to "remote_newyork" (cluster identifier 80*c*) is needed to resolve the database query 42. The preliminary tag search server 64 (executing the tag query handler 72) may conclusively determine, in response to the preliminary tag search 60, that the network connection 82*c* to "remote_newyork" (cluster 34*c*) is unnecessary to answer the database query 42. The preliminary tag search server 64 need only establish the network connection 82*b* and limit the cross-cluster search 50 to "remote_paris" (cluster 34*b*). Time and resources would be wasted querying "remote_newyork" (cluster 34*c*).

In this example, then, the query tags 62 identify the network connection 82. Each query tag 62 may be defined when configuring the network connection 82 to the remote cluster 34. When the database query 42 is received, the distributed database service 28 (such as the preliminary tag search server 64) may first conduct the preliminary tag search 60 prior to conducting the local cluster search 84 and/or the cross-cluster search 50. The preliminary tag search 60 reveals which network connections 82, from a full set of network connections (such as those specified by the clusteral tag inventory 78), are relevant to retrieving successful/positive search results 46. The distributed database service 28, as another example, may tag each database record (e.g., the electronic data 30) with its corresponding query tag 62 (such as its corresponding network connection 82, cluster identifier 80, or other metadata). The preliminary tag search 60 reveals which cross-cluster search 50 would be fruitless and negative, so there is no advantage to searching that corresponding cluster 34. The database query 42 ("#clusteridentity!=remote-newyork") asks to filter out all search results 46 from "remote_newyork," so there is no reason nor need to cross-cluster search cluster 34*c*. Time and resources would be wasted.

The preliminary tag search 60 quickly and simply identifies the search results 46. The preliminary tag search 60, for example, may reveal which local and/or remote clusters 34 will yield positive/yes search results 46. The preliminary tag search 60, however, as another example, may determine which or what clusters 34 will return fruitless/no results. The electronic data 30 and/or the query parameter 42, for example, may have query tags 62 that are unknown to the clusteral tag inventory 78. As an example, suppose "cluster A" has query tags 62 defined in the clusteral tag inventory 78 that are "region": "EU" and "type": "music." Suppose also that "cluster B" has query tags 62 defined in the clusteral tag inventory 78 that are "region": "US". If the human user 47 performs a search of "#type!=music", then the user 47 wants the data 30 that does not have the type music. The preliminary tag search 60 thus immediately reveals that all data 30 stored in cluster A is fruitless, as cluster A stores type music per the clusteral tag inventory 78. The preliminary tag search 60, however, does not reveal the type of data 30 stored in cluster B, so the tag query handler 72 may, or may not, search cluster B. The preliminary tag search 60 only predicted or determined that cluster A is fruitless. The cross-cluster search 50 of cluster B is unknown and cannot be predicted. The tag query handler 72 may, or may not, conduct the cross-cluster search 50 of cluster B. Perhaps cluster B ends up only having data of type music as well, but the search result 46 may be unknown until after the cross-cluster search 50 of cluster B is conducted. The search result 46 may thus be predicted based on the clusteral tag inventory 78. When the clusteral tag inventory 78 stores the network connections 82 associated with their corresponding query tags 62, then the distributed database service 28 (such as the preliminary tag search server 64) may add these query tags 62 to the electronic data 30 (such as the cybersecurity events 110) passing through that network connection 82 at search time. The distributed database service 28 may thus reliably and correctly predict, or perhaps even guarantee, a fruitless network connection 82.

FIG. 7 illustrates some examples using application programming interfaces (or APIs) 100. The query tag 62 may have a content, meaning, or definition. FIG. 7, for example, illustrates the query parameter 44 as the API 100. When the human user 47 of the client device 26 specifies the query parameter 44, suppose the human user 47 only wishes to retrieve the historical electronic data 30 associated with the API 100. The database query 42, in other words, specifies the API 100 in a data field or other portion within the query parameter 44. When the distributed database service 28 receives the database query 42, the distributed database service 28 may conduct the preliminary tag search 60 before conducting the cross-cluster search 50. The distributed database service 28, for example, may forward or route the database query 42 to the preliminary tag search server 64 for providing the preliminary tag search 60. When the preliminary tag search server 64 receives the database query 42, the preliminary tag search server 64 reads the API 100 specified by the database query 42 and queries the clusteral tag inventory 78 for the API 100. In this example, the clusteral tag inventory 78 may associate the API 100 to its corresponding cluster identifier 80. The clusteral tag inventory 78 may thus include entries that associated different APIs 100 to their corresponding clusteral identifiers 80. The clusteral tag inventory 78 may thus identify which remote cluster 34 (and/or the local cluster 34 illustrated in FIG. 4) stores the electronic data 30 tagged or associated with the API 100. The preliminary tag search 60, for example, may reveal which cross-cluster search 50 would be successful/positive/fruitful/relevant and/or which cross-cluster search 50 would be unsuccessful/negative/fruitless/irrelevant/wasteful. The distributed database service 28 may thus confine the cross-cluster searches 50 to those clusters 34 positively and/or negatively identified by the clusteral tag inventory 78.

FIG. 8 illustrates more examples of the clusteral tag inventory 78. The clusteral tag inventory 78 maps, relates, or associates different query tags 62 to their corresponding clusteral identifiers 80. The clusteral tag inventory 78, though, may even specify finer relationships between the query tags 62 and their corresponding database shards 36. That is, the cluster identifier 80 may include the nodal network address 92 of the cluster node 32 maintaining the nodal shard 36 that stores or contains the electronic data 30 associated with the query tag 62. So, when the distributed database service 28 conducts the preliminary tag search 60 (such as by the preliminary tag search server 64), the preliminary tag search 60 may identify and retrieve the matching network address 92 associated with the relevant nodal shard 36. The clusteral tag inventory 78 may thus reveal the clusteral node 32 (such as the nodal_name or shard_name and the nodal network/IP address 92) storing successful/positive/fruitful/relevant search results 46. The clusteral tag inventory 78 may additionally or alternatively reveal the clusteral node(s) 32 that do not store fruitful/relevant search results 46 (as earlier explained). The distributed database service 28 may thus even more quickly and efficiently conduct, or ignore, the cross-cluster search 50 by directly querying the cluster node 32 maintaining the nodal shard 36.

Figure 9:
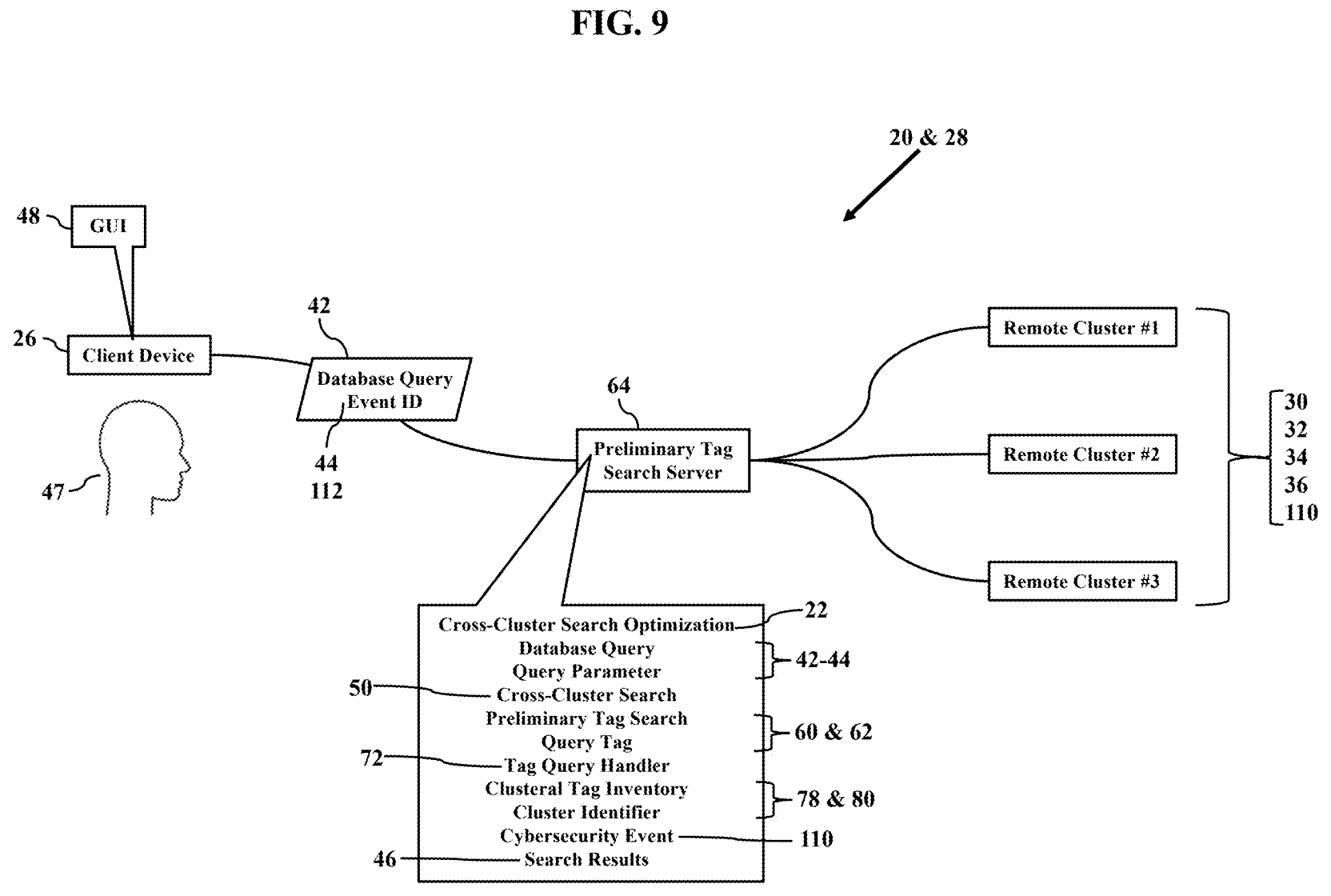

FIG. 9 illustrates still more examples of the clusteral tag inventory 78. The clusteral tag inventory 78 may relate the query tags 62 to their corresponding cybersecurity events 110. That is, the electronic data 30 stored by the distributed database service 28 may include cybersecurity events 110 associated with the cloud service 20 (such as a cybersecurity service). The cybersecurity events 110, for example, may be associated with operating system events logged in response to requests by software applications (include safe/harmless events and suspicious/malicious events). Each cybersecurity event 110 may be associated with its corresponding event identifier 112. When the distributed database service 28 receives the database query 42, the query parameter 44 may specify one or more event identifiers (illustrated as "Event ID") 112 of interest to the human user 47. When the distributed database service 28 receives the database query 42, the distributed database service 28 may conduct the preliminary tag search 60 prior to conducting the local cluster search 84 (illustrated in FIG. 4) and/or the cross-cluster search 50. The distributed database service 28, for example, may forward or route the database query 42 to the preliminary tag search server 64 for providing the preliminary tag search 60. When the preliminary tag search server 64 receives the database query 42, the preliminary tag search server 64 reads the event identifier(s) 112 specified by the database query 42 and queries the clusteral tag inventory 78 for the event identifier(s) 112. In this example, the clusteral tag inventory 78 may associate each event identifier 112 to its corresponding cluster identifier 80 (such as the network connection 82, the cluster name 90, the network address 92, or other identifying information). The clusteral tag inventory 78 may thus include entries that associated different even identifiers 112 to their corresponding clusteral identifiers 80. The clusteral tag inventory 78 may thus identify which remote cluster 34, and/or if the local cluster 34, stores the electronic data 30 tagged or associated with the event identifier 112. The preliminary tag search 60, for example, reveals which cross-cluster search 50 would yield successful/positive/fruitful/relevant search results 46 and/or which cross-cluster search 50 would be unsuccessful/negative/fruitless/irrelevant/wasteful. The distributed database service 28 may thus confine the cross-cluster search 50, and/or the local cluster search 84, to those clusters 34 positively identified by the clusteral tag inventory 78.

Figure 11:
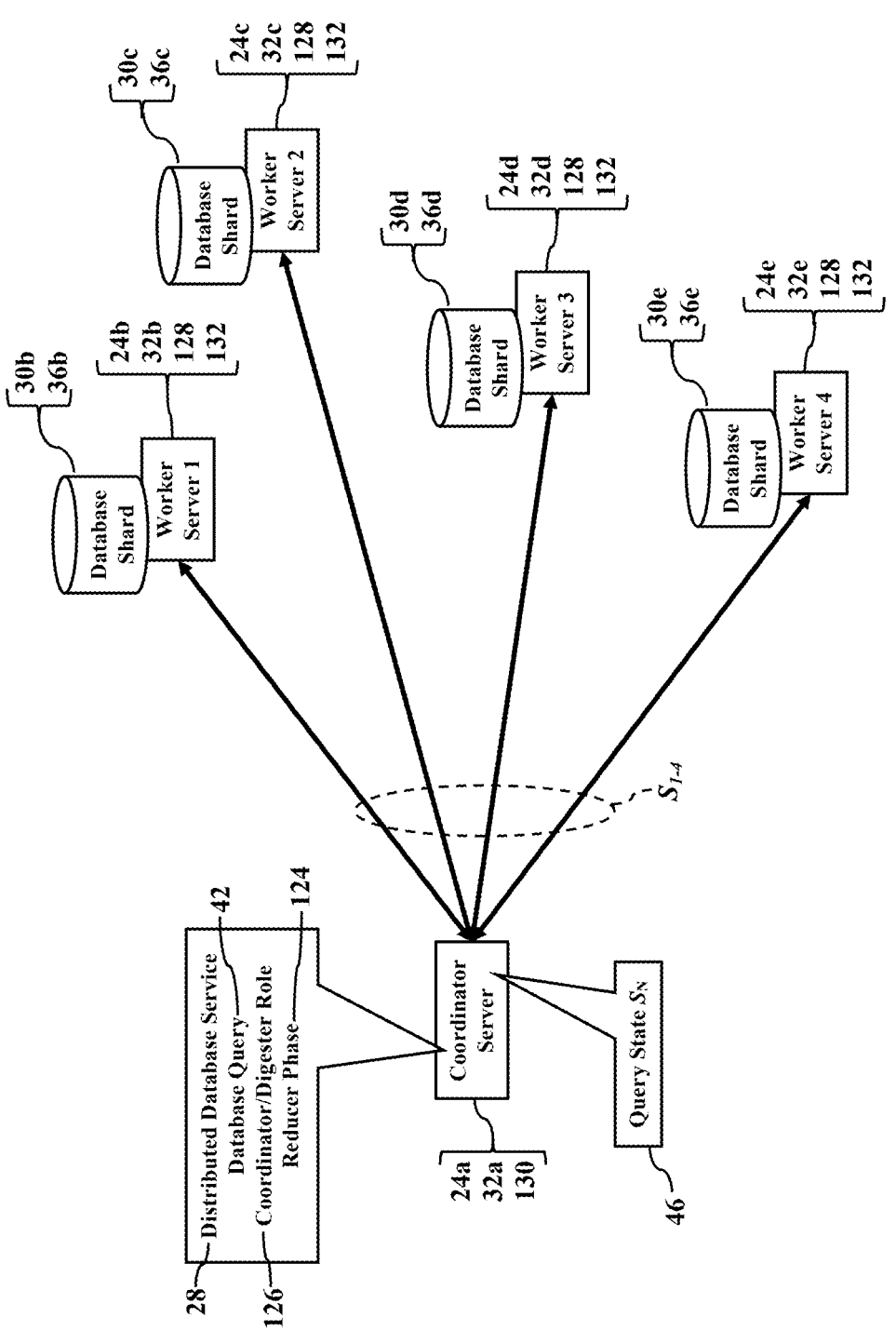

FIGS. 10-11 illustrate examples of the clusteral tag inventory 78 implemented in a mapreduce database framework 120. The cloud-based distributed database service 28 may implement the mapreduce database framework 120 to store and to retrieve large datasets of the electronic data 30. The mapreduce database framework 120 may also implement the clusteral tag inventory 78 to quickly and more efficiently conduct the cross-cluster searches 50 that successfully produce the search results 46 responsive to the database query 42. Each computing cluster 34 provides the distributed database service 28, and each computing cluster 34 may use the mapreduce database framework 120 to generate the search results 46 in response to the database query 42. The mapreduce database framework 120 uses mapping functions and reducing functions (hence the term mapreduce) to generate search results in large datasets. A mapper phase 122, for example, may be highly distributive and processes terabytes (TB) of the electronic data 30. A reducer phase 124, though, may be centralized and process/merge much smaller datasets to produce the final/reduced search result 46. The mapreduce database framework 120 may have even more phases that further query and/or process datasets. The mapreduce database framework 120 is generally used by many big data cloud services (such as AMAZON®, MICROSOFT®, IBM®, and CROWDSTRIKE®), so the mapreduce database framework 120 need not be explained in detail. The distributed database service 28 may implement the clusteral tag inventory 78 to quickly and efficiently narrow down which remote cluster(s) 34 should, and/or should not, be searched for positive/fruitful/relevant search results 46.

The cloud-based distributed database service 28 may further include role play. The cloud-based distributed database service 28 may implement roles or responsibilities. The cloud-based distributed database service 28, for example, may assign a coordinator role 126 and/or a worker role 128. The coordinator role 126, for example, may manage or administer the distributed database service 28, the database query 42, and the clusteral tag inventory 78. The worker role 128, for example, may perform data storage/retrieval work (such as the actual database search operations). One or more of the computer systems/nodes 24/32 may have the coordinator role 126, and one or more of the computer systems/nodes 24/32 may have the worker role 128. Indeed, the computer systems/nodes 24/32 may dynamically switch from, between, and/or to the coordinator role 126 and the worker role 128. Each computer system/node 24/32 may thus locally store and execute the tag query handler 72, thus again allowing each computer system/node 24/32 to function or perform according to the coordinator role 126 and/or to the worker role 128. The computer systems/nodes 24/32 may thus be indicated as a coordinator server 130 or as a worker server 132, depending on the dynamically-assigned coordinator role 126 or the worker role 128.

Figure 12:
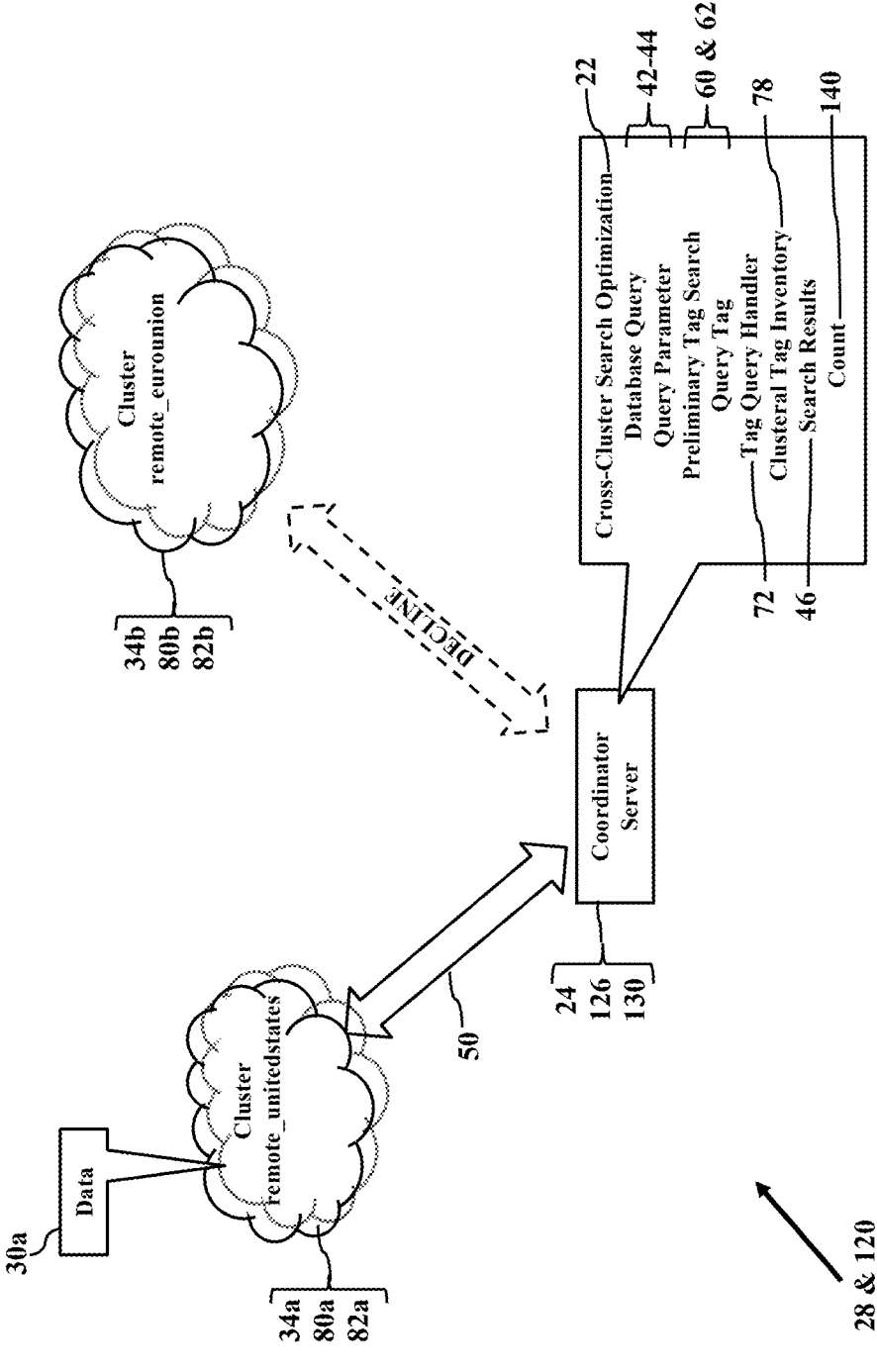
FIG. 12 illustrates examples of the mapreduce database framework conducting cross-cluster searches.

FIG. 12 illustrates more examples of the mapreduce database framework 120 conducting the cross-cluster searches 50. In these examples, the coordinator server 130 (performing the coordinator role 126) may also conduct the preliminary tag search 60. The coordinator server 130 has the network connection 82*a* to "remote_unitedstates" (cluster identifier 80*a*) and the network connection 82*b* to "remote_eurounion" (cluster identifier 80*b*). When the coordinator server 130 receives the database query 42, the coordinator server 130 may perform the preliminary tag search 60 on behalf of the mapreduce database framework 120. Because the coordinator server 130 is another example of the computer system 24, the coordinator server 130 has the hardware processor/cores 76 that executes the tag query handler 72 stored in the memory device 74 (as illustrated by FIG. 3). The coordinator server 130 compares the query parameter 44 to the clusteral tag inventory 78. If, for example, the query parameter 44 matches one or more query tags 62 in the clusteral tag inventory 78, then the tag query handler 72 instructs the coordinator server 130 to conduct the cross-cluster search 50 and query the corresponding cluster identifier 80. If, however, the query parameter 44 fails to match the query tags 62 in the clusteral tag inventory 78, then the tag query handler 72 instructs the coordinator server 130 to decline or fail to conduct the cross-cluster search 50. The coordinator server 130 conducts, or skips, the cross-cluster search 50 based on the preliminary tag search 60 and the logical structure between the query parameter 44 and the clusteral tag inventory 78 (and, or, !, and other logic operators).

Again, then, the clusteral tag inventory 78 greatly narrows down cross-cluster searches 50 by the mapreduce database framework 120. However the query parameter 44 is specified (such as a text search string), the coordinator server 130 may perform the preliminary tag search 60 as a preprocessing step prior to conducting multiple intensive and expensive cross-cluster searches 50. The mapreduce database framework 120 may thus implement the preliminary tag search 60 to restrict or reduce a numerical count 140 of the cross-cluster searches 50 performed. The clusteral tag inventory 78 may precisely target and define which cross-cluster search(es) 50 will produce successful/positive/fruitful/relevant search results 46. The clusteral tag inventory 78 may additionally or alternatively reveal which cross-cluster search(es) 50 would be unsuccessful/negative/fruitless/irrelevant/wasteful. The mapreduce database framework 120 may thus implement the preliminary tag search 60 to avoid indiscriminately conducting unsuccessful cross-cluster searches 50 that waste hardware, network, and energy resources.

Figure 13:
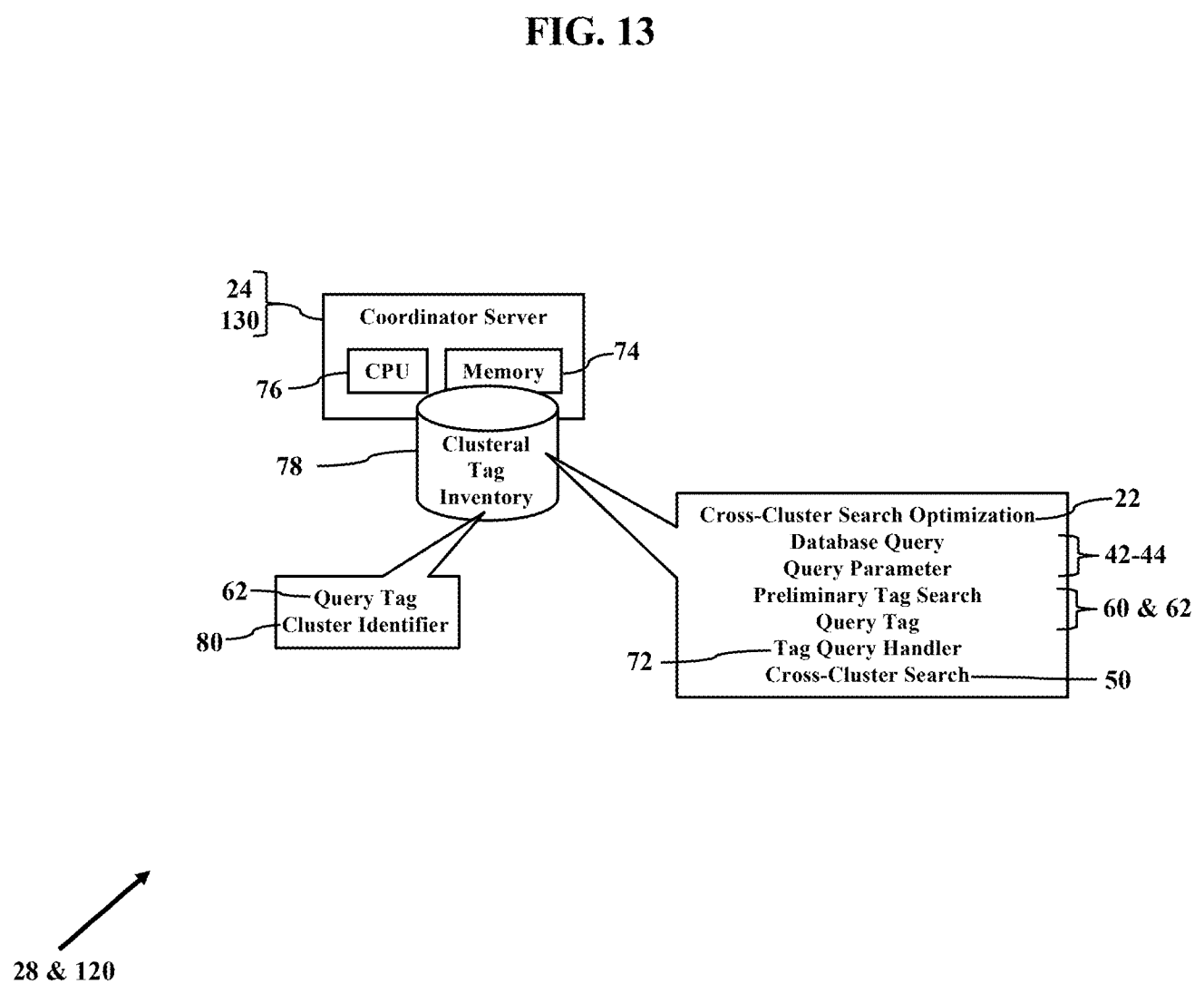
Figure 14:
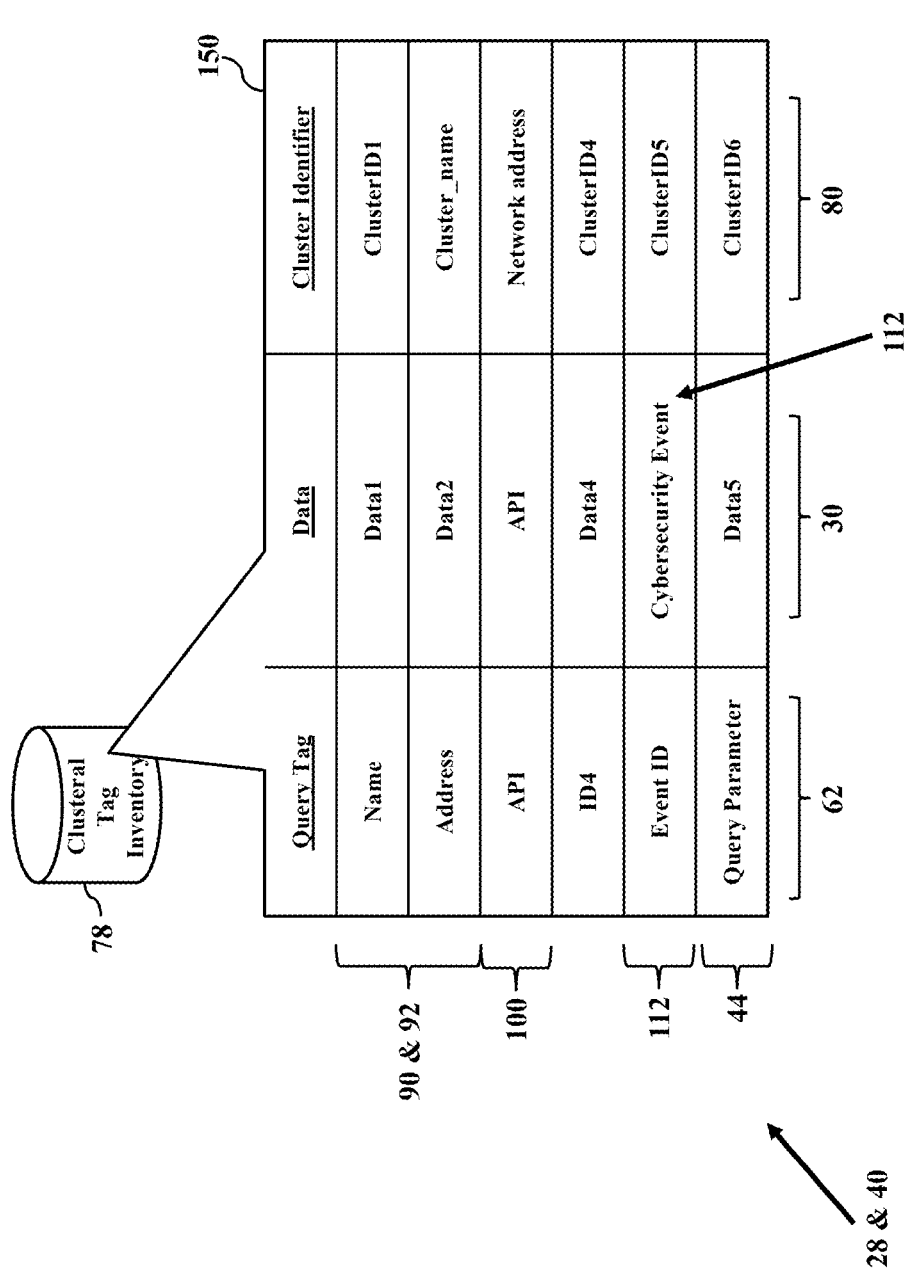

FIGS. 13-14 illustrate more examples of cloud processing. FIG. 13 illustrates the computer system 24 locally storing the clusteral tag inventory 78 in the local memory device 74. FIG. 13, for simplicity, again illustrates the computer system 24 as the coordinator server 130 associated with the mapreduce database framework 120. Even though the clusteral tag inventory 78 may be remotely stored and maintained by other nodal members, FIG. 13 illustrates a simple example of local server storage. The coordinator server 130 may thus locally store the clusteral tag inventory 78 in the local memory device 74. The clusteral tag inventory 78 stores and logs electronic records representing different query tags 62 and their corresponding clusteral identifiers 80. The coordinator server 130 may thus query the clusteral tag inventory 78 for the query parameter 44 specified by the database query 42. The coordinator server 130 identifies the corresponding cluster identifier 80 and conducts the cross-cluster search 50 according to the cluster identifier 80.

As FIG. 14 illustrates, the distributed database service 28 maintains a rich repository of historical tag and clusteral knowledge. As the cloud computing network/environment 40 receives and logs the electronic data 30, the cloud computing network/environment 40 may tag and log the electronic data 30 along with its associated query tag 62 and other metadata (such as the corresponding date/time stamp). As one example, the distributed database service 28 may have service features that allow the human user (illustrated as reference numeral 47 in FIGS. 1-2) to annotate, or tag, the electronic data 30 when specifying the cross-cluster search 50 (such as via inputs or selections in the graphical user interface 48). The user 47, as another example, may define the query tag 62 when configuring the network connection 82 to the cluster 34. For example, even though the clusteral tag inventory 78 may have other logical structures, a relational database structure is perhaps easiest to understand. FIG. 14 thus illustrates the clusteral tag inventory 78 as an electronic database table 150 having tabular row and columnar database entries that map, relate, convert, or associate different query tags 62 to their corresponding clusteral identifiers 80. Whatever the electronic data 30 stored by the cloud computing network/environment 40, the distributed database service 28 may tag the electronic data 30 with its corresponding query tag 62. The distributed database service 28 may add database entries to the clusteral tag inventory 78 that log each query tag 62 with its corresponding cluster identifier 80. So, when the distributed database service 28 receives the database query 42, the distributed database service 28 (such as the affiliated coordinator server 130 illustrated in FIG. 13) may read the query parameter 44 and first conduct the preliminary tag search 60 prior to conducting multiple intensive, expensive, and potentially unsuccessful cross-cluster searches 50. The coordinator server 130 may query the clusteral tag inventory 78 for the query parameter 44 and identify matching or similar historically-logged query tags 62. If a matching database entry is determined, then the coordinator server 130 may identify and/or retrieve the corresponding columnar/row entries specifying the cluster identifier(s) 80. The coordinator server 130 may then conduct the cross-cluster search 50 by querying the cluster 34 or even the nodal shard 36 associated with the cluster identifier 80 (as previously explained with reference to FIGS. 1-8). The preliminary tag search 60 thus reduces the numerical count 140 of the cross-cluster searches 50 by revealing only those successful cross-cluster search(es) 50 that would yield search results 46. The preliminary tag search 60 further reveals which unsuccessful cross-cluster search(es) 50 would produce no search results. The distributed database service 28 may thus confine or limit the numerical count 140 of the cross-cluster searches 50 to only those identified by the clusteral tag inventory 78.

Figure 16:
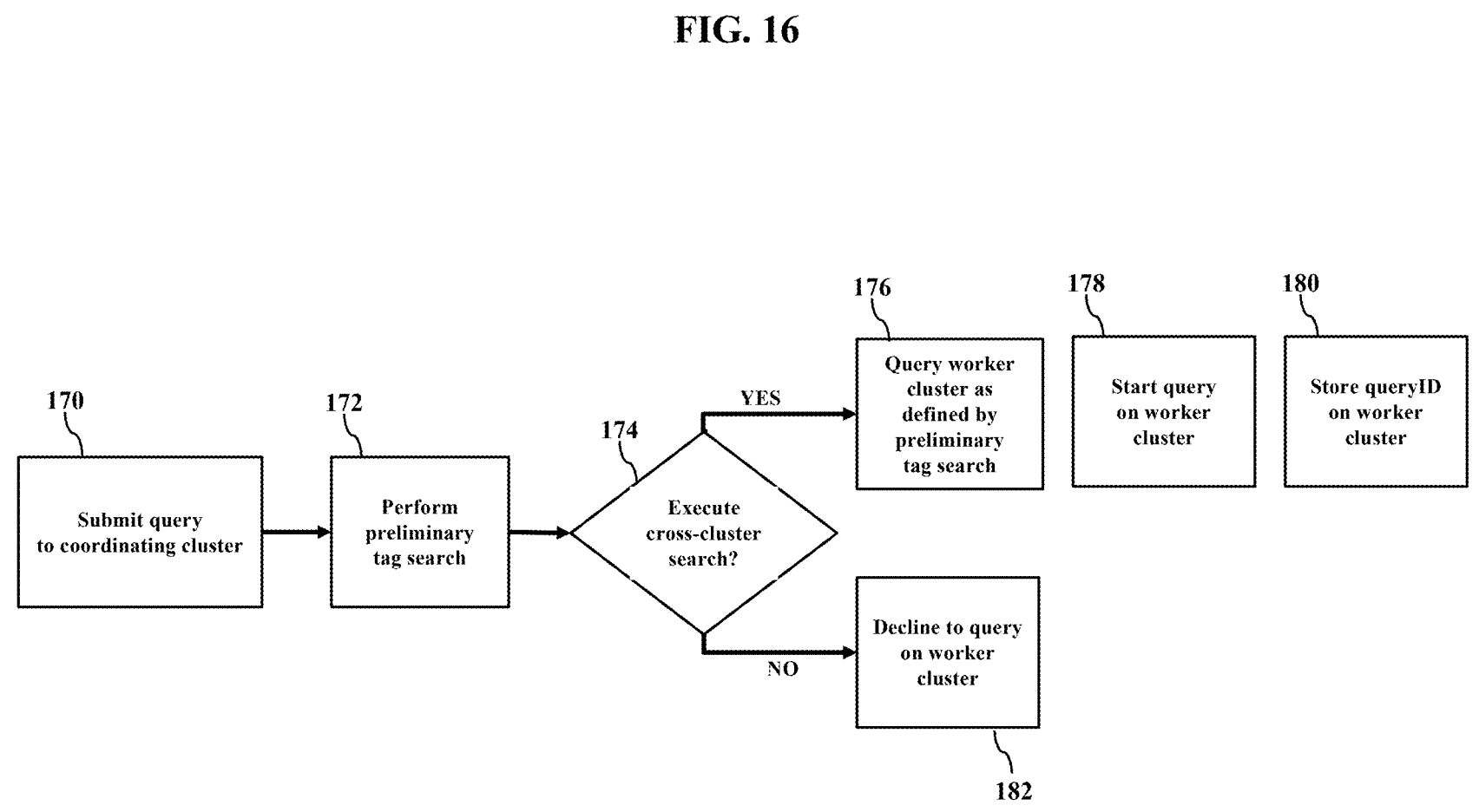
Figure 17:
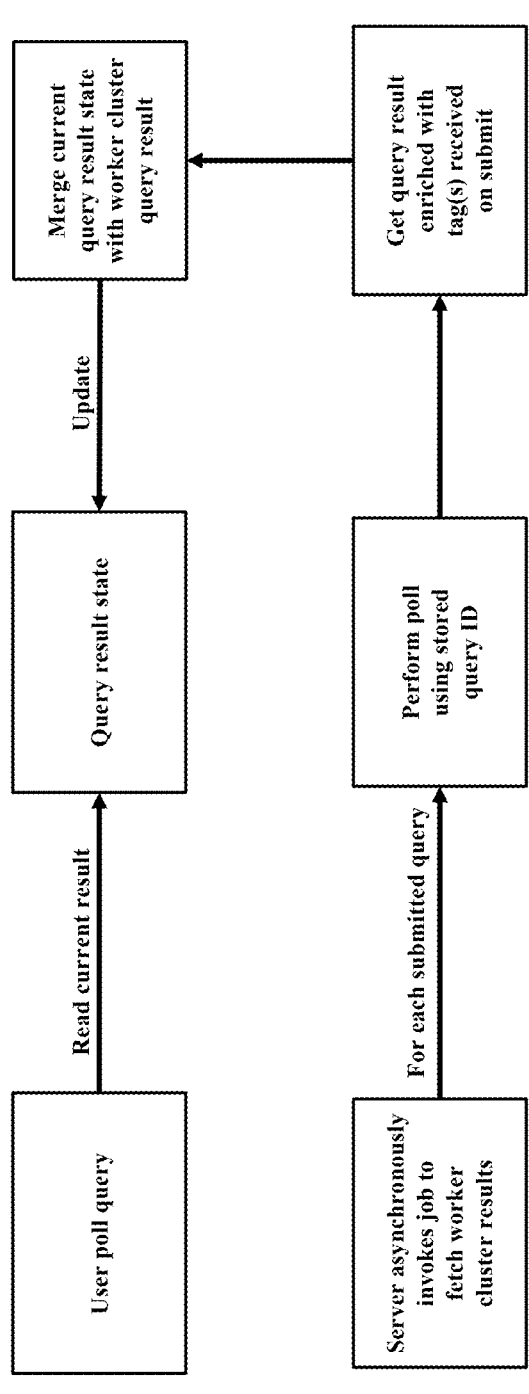

FIGS. 15-17 illustrate more examples of cloud processing. FIG. 15, for example, illustrates a simple topology associated with the mapreduce database framework 120. A coordinating cluster C (illustrated as reference numeral 160) interfaces via the network connection 82a with worker cluster $W_1$ (illustrated as reference numeral 162). The coordinating cluster 160 also interfaces via the network connection 82b with worker cluster $W_2$ (illustrated as reference numeral 164). In actual practice, though, the coordinating cluster 160 may have more network connections 82 to more worker clusters. The coordinating cluster 160 may have many computing nodes (not shown for simplicity) that perform the coordinator role 126. Each worker cluster 162/164 have many computing nodes (again, not shown for simplicity) that perform the worker role 128. FIG. 15 thus illustrates a simple topology associated with a multi-cluster search. The mapreduce database framework 120 may utilize one or multiple query tags 62 (such as the different query tags 62 that each correspond to different APIs 100, as explained with reference to FIG. 8). As this disclosure above explained, let's assume that the network connection 82a is from C to $W_1$ (Paris) and from C to $W_2$ (New York), and with an additional network connection to the coordinating cluster 160 itself (not shown for simplicity). Let's further assume, again for simplicity, that these network connections 82a-b each have a single query tag 62 (configured using the key "#clusteridentity" and having the respective values "remote-paris", "remote-newyork" and "local-london"). If a database search is made on this topological view, then all search results 46 (such as the cybersecurity events 110) will contain the key "#clusteridentity" (as defined for all network connections 82), but the cybersecurity events 110 will have different values depending on where the search result 46 arrived from.

The preliminary tag search 60 reveals which cross-cluster searches 50 will be successful. As the query tags 62 are predefined prior to the database query 42, the preliminary tag search 60 may be performed prior to conducting one or more of the cross-cluster search 50. The preliminary tag search 60 evaluates the query string or parameter 44 against the clusteral tag inventory 78 and uses that to determine, for each network connection 82, whether or not the worker cluster 34 at the end of that network connection 82 even needs to be included in the query. If the query string "#clusteridentity!=remote-newyork" (e.g., show all cybersecurity events 110 where the #clusteridentity tag is different from remote-newyork) is submitted, for example, then the preliminary tag search 60 determines, before even seeing a single search result 46, that no search results 46 from the network connection 82 with the clusteridentity tag with value remote-newyork will be relevant. There is no benefit to conducting a cross-cluster search 50 of "remote-newyork."

FIG. 16 illustrates a simple example of a multi-cluster search query. When the database query 42 is received (Block 170), the coordinating cluster C (such reference numeral 160 illustrated in FIG. 15) performs the preliminary tag search 60 to determine which cross-cluster searches 50 should be conducted (Block 172). The preliminary tag search 60 identifies which cross-cluster search(es) 50 are queried to retrieve the search results 46. Then, for each network connection 82, the coordinating cluster C makes a decision on whether or not to submit the query to the network connection 82 (Block 174), and this decision is taken based on the preliminary tag search 60 that compares the user-defined query string or parameter 44 and the query tags 62 configured on the network connection 82. If the cross-cluster search 50 is authorized by the preliminary tag search 60 (Block 174), then the coordinating cluster C queries the corresponding worker cluster (such reference numerals 162/ 164 illustrated in FIG. 15) (Block 176). The worker cluster starts and executes the query (Block178) and records the query work (Block 180). If, however, the cross-cluster search 50 is not authorized by the preliminary tag search 60 (Block 174), then the coordinating cluster C declines to conduct the cross-cluster search 50 of an unauthorized worker cluster (Block 182).

FIG. 17 illustrates a simple example of polling. The mapreduce database framework 120 (such the coordinating cluster C illustrated as reference numeral 160 in FIG. 15) may conduct a multi-cluster search query by polling. When the database query 42 is received, the coordinating cluster C performs the preliminary tag search 60 to determine which cluster(s) is/are successfully queried (e.g., the cross-cluster searches 50) to retrieve the search results 46. The coordinating cluster 160, for example, may request for the current search results 46 every few seconds until the query is done. However, the coordinating cluster 160 may split clusteral polling into two (2) parts. Some polling, for example, may be performed according to a schedule (perhaps decided by the coordinating cluster 160). Other polling, though, may be performed by users (such as the human user 47 illustrated in FIGS. 1-2) of the distributed database system 38. The polling done by the users, for example, may be performed via an external API or by the GUI 48 (illustrated with reference to FIGS. 1-2). The scheduled polls occur between the coordinating cluster 160 and its worker clusters 162/164. This scheduled polling, though, may only be performed on clusters 34 identified via the preliminary tag search 60 (meaning unsuccessful cross-cluster searches 50 are unnecessary and ignored).

The preliminary tag search 60 thus greatly optimizes the multi-cluster, cross-cluster searches 50. The GUI 48, for example, may allow the human user 47 to configure the database search across the multiple clusters 34 (such as a "Multi-Cluster View" or other visual representation). The GUI 48, though, may only be defined and represented according to the coordinating cluster 160. This view may then be configured with "Connections" (e.g., the network connections 82) which each represent a cluster 34 that can be searched. For each of these network connections 82 a token may be established which identifies a specific View/ Repository in another cluster 34 with some permissions attached to it. Additionally, the user 47 may then configure the query tags 62 on these network connections 82. Again, as simple examples, one such query tag 62 may be a name, geographic region, or other unique identifying information. These query tags 62 may be locally stored in the cluster 34 (such as the coordinating cluster 160). Whenever a database search is submitted on a multi-cluster view, the distributed database system 38 (perhaps delegated to the coordinating cluster 160) performs the preliminary tag search 60 that evaluates the set of query tags 62 for each network connection 82 against the query string or other parameter 44. If the preliminary tag search 60 determines that the network connection 82 will be unsuccessful and contribute nothing to the final search result 46, then the coordinating cluster 160 exclude the corresponding cross-cluster search 50. The coordinating cluster 160, in other words, declines to conduct the unsuccessful cross-cluster search 50, as unsuccessful queries would only waste resources.

The distributed database system 38 maintains the clusteral tag inventory 78. A nodal member of the distributed database system 38 may locally store the clusteral tag inventory 78. The distributed database system 38, for example, may delegate the clusteral tag inventory 78 to the coordinating cluster 160. The coordinating cluster 160 may then delegate the clusteral tag inventory 78 to a cluster member (such as the coordinator server 130). Suppose, as more examples, that the coordinating cluster 160 has three (3) network connections 82 to three (3) remote clusters A, B and C. These clusters could have the tags:

Cluster A:
    name: A
    region: US
    Cluster B:
    name: B
    region: EU
    Cluster C:
    name: C
    region: US These clusters could each contain similar data of the form "CPUInfo cpuUsagePercentage=50" where the 50 could be a percentage really depending on the measurement. The distributed database system 38 may then build a viewable chart as the GUI 48 with the query:

"timechart (#name, function-[max (cpuUsagePercentage)])".

The client device 26 (generating the GUI 48 for display) may thus produce the search result 46 as a graph with the cpuUsagePercentage reported by each cluster 34 identified by their name tag over time. If the query string or parameter 44 were then extended to:

"#region!="US" | timechart (#name, function-[max (cpuUsagePercentage)])",
    then the search result 46 may be the same, but only for the EU cluster, and no network requests need be made to the US clusters.

The distributed database service 28 is only simply described. The distributed database service 28 distributes the portions or shards 36 of the distributed database 38 among the computer nodes 32. In an actual data center or server farm, for example, the distributed database service 28 may have many different clusters 34, and each cluster 34 may have many (perhaps even hundreds or thousands) of the computer nodes 32 providing the distributed database service 28. Such a large computer cluster 34, though, is too confusing and too difficult to illustrate. FIGS. 1-17 thus only illustrate simple examples of a few clusters and their few corresponding computer systems 22 as computer nodes 32. Each computer node 32 may thus store its corresponding database shard 36. Each computer system/node 24/32 is associated with the cluster 34, but the computer systems 24 may have other geographical or logical grouping or organization (such as the aforementioned data center or even a single computer machine).

The preliminary tag search 60 may be implemented regardless of the operating system 70. Familiar examples of the operating system 70 include a version of MICROSOFT WINDOWS®, APPLE MACOS® and IOS®, GOOGLE ANDROID®, UNIX®, and LINUX®. Indeed, the preliminary tag search 60 may be adapted to other operating systems.

FIG. 18 illustrates examples of a method or operations executed by the computer system 24 that improves functioning by identifying the successful cross-cluster search 50. The database query 42 is received (Block 200). Prior to conducting multiple cross-cluster searches 50 associated with the database query 42, though, the preliminary tag search 60 is performed that identifies the successful cross-cluster search 50 that will produce the search results 46 (Block 202). The successful cross-cluster search 50, identified by the preliminary tag search 60, is conducted (Block 204). The computer system 24 declines to conduct unsuccessful cross-cluster searches 50 identified by the preliminary tag search as not producing the search results 46 (Block 206).

FIG. 19 illustrates more examples of a method or operations that improve functioning by identifying the cross-cluster search 50. The database query 42 is received that specifies the query parameter 44 (Block 210). Prior to conducting the multiple cross-cluster searches 50, though, the coordinator server 130, performing the coordinator role 126 associated with the mapreduce database framework 120, conducts the preliminary tag search 60 by comparing the query parameter 44 to the clusteral tag inventory 78 specifying the cluster identifiers 80 (Block 212). In response to the preliminary tag search 60 conducted prior to the multiple cross-cluster searches 50, the coordinator server 130 identifies the cluster identifier 80 specified by the clusteral tag inventory 78 that matches the query parameter 44 specified by the database query 42 (Block 214). After performing the preliminary tag search 60 that identifies the cluster identifier 80 specified by the clusteral tag inventory 78, the coordinator server 130 conducts only the cross-cluster search 50 identified by the cluster identifier 80 specified by the clusteral tag inventory 78 (Block 216).

Figure 20:
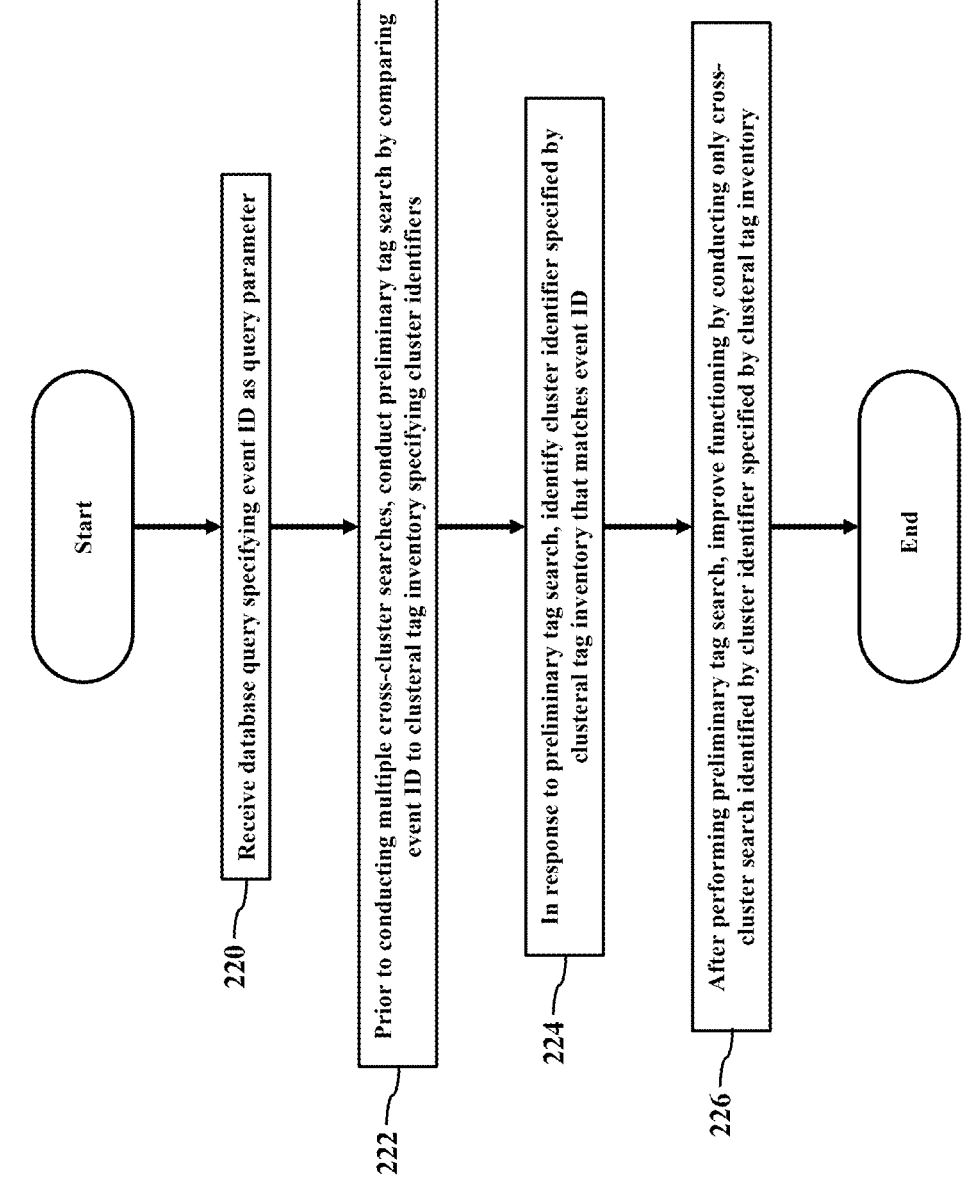

FIG. 20 illustrates still more examples of a method or operations that improve functioning by identifying the cross-cluster search 50. The database query 42 is received that specifies the cybersecurity event identifier 112 as the query parameter 44 (Block 220). Prior to conducting the multiple cross-cluster searches 50 associated with the mapreduce database framework 120 storing the cybersecurity events 110, though, the coordinator server 130 conducts the preliminary tag search 60 that compares the cybersecurity event identifier 112 to the clusteral tag inventory 78 specifying the cluster identifiers 80 (Block 222). In response to the preliminary tag search 60 conducted prior to the multiple cross-cluster searches 50, the coordinator server 130 identifies the cluster identifier 80 specified by the clusteral tag inventory 78 that matches the cybersecurity event identifier 112 specified by the database query 42 (Block 224). After performing the preliminary tag search 60 that identifies the cluster identifier 80 specified by the clusteral tag inventory 78, the coordinator server 130 improving the functioning by conducting only the cross-cluster search 50 identified by the cluster identifier 80 specified by the clusteral tag inventory 78 (Block 226).

Figure 21:
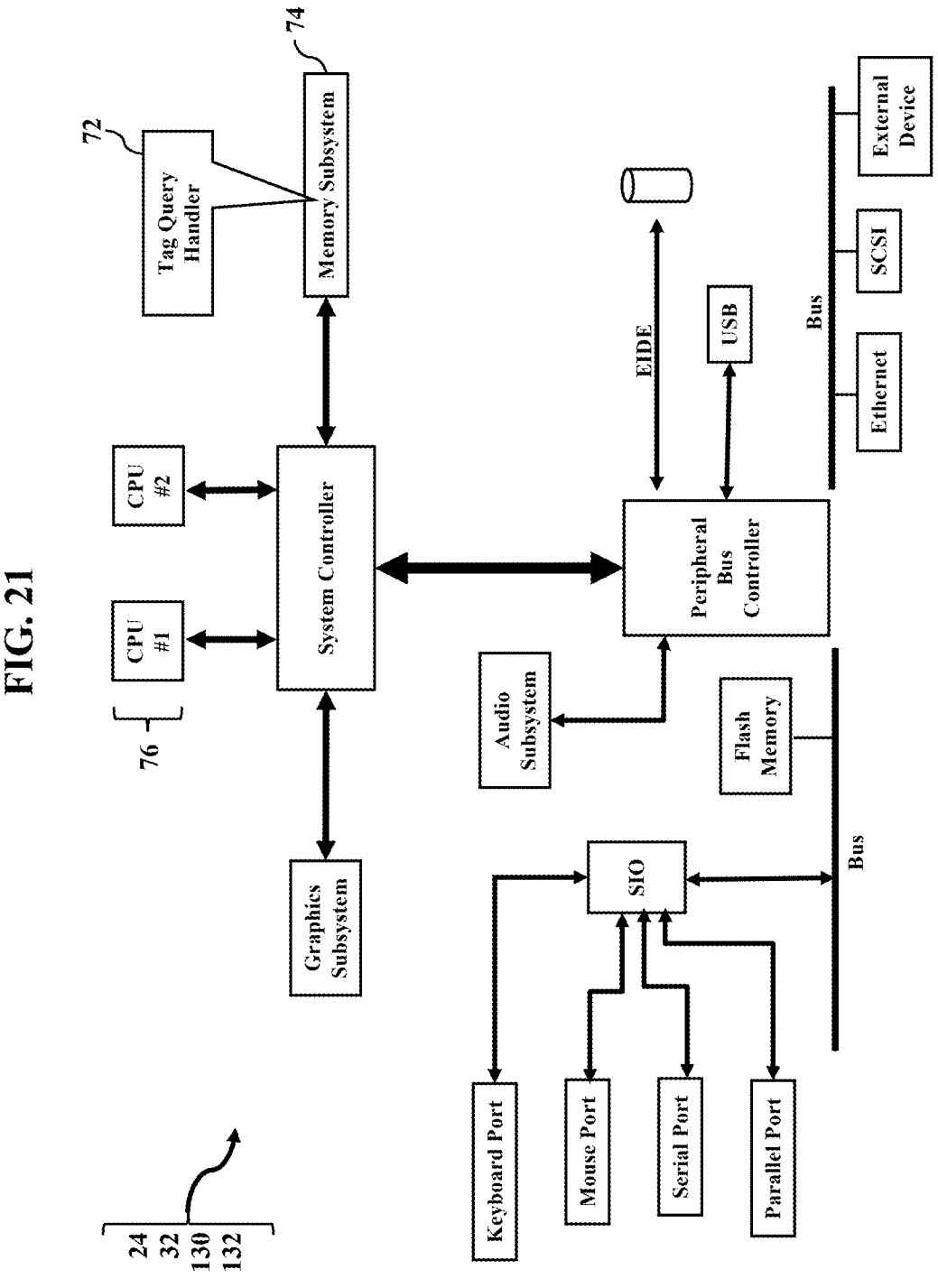
FIG. 21 illustrates a more detailed example of the operating environment.

FIG. 21 illustrates a more detailed example of the operating environment. FIG. 21 is a more detailed block diagram illustrating the computer system 24. The computer system 24 may represent the node 32, the coordinator server 130, and the worker server 132. The query tag handler 72 is stored in the memory subsystems or devices 74. One or more of the processors/cores 76 communicate with the memory subsystem or device 74 and execute the query tag handler 72. Examples of the memory subsystem or device 74 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and other read/write memory technology. Because the computer system 24 is known to those of ordinary skill in the art, no detailed explanation is needed.

The computer system 24 may have other embodiments. This disclosure mostly discusses the computer system 24 as the node 32, the coordinator server 130, and the worker server 132. The query tag handler 72, however, may be easily adapted to other operating environments, such as a switch, router, or other network member of the computing cluster 34. The query tag handler 72 may also be easily adapted to other devices, such as where the computer system 24 may be a laptop computer, a smartphone, a tablet computer, or a smartwatch. The query tag handler 72 may also be easily adapted to other embodiments of smart devices, such as a television, an audio device, a remote control, and a recorder. The query tag handler 72 may also be easily adapted to still more smart appliances, such as washers, dryers, and refrigerators. Indeed, as cars, trucks, and other vehicles grow in electronic usage and in processing power, the query tag handler 72 may be easily incorporated into a vehicular controller.

The preliminary tag search 60 may be applied regardless of the networking environment. The preliminary tag search 60 may be easily adapted to stationary or mobile devices having wide-area networking (e.g., 4G/LTE/5G cellular), wireless local area networking (WI-FI®), near field, and/or BLUETOOTH® capability. The preliminary tag search 60 may be applied to stationary or mobile devices utilizing a portion of the electromagnetic spectrum and a signaling standard (such as the IEEE 802 family of standards, GSM/CDMA/TDMA or other cellular standard, and/or the ISM band). The preliminary tag search 60, however, may be applied to a processor-controlled device operating in the radio-frequency domain and/or the Internet Protocol (IP) domain. The preliminary tag search 60 may be applied to a processor-controlled device utilizing a distributed computing network, such as the Internet (sometimes alternatively known as the "World Wide Web"), an intranet, a local-area network (LAN), and/or a wide-area network (WAN). The preliminary tag search 60 may be applied to a processor-controlled device utilizing power line technologies, in which signals are communicated via electrical wiring. Indeed, the many examples may be applied regardless of physical componentry, physical configuration, or communications standard(s).

The computer system 24 may utilize a processing component, configuration, or system. For example, the preliminary tag search 60 may be easily adapted to a desktop, mobile, or server central processing unit or chipset offered by INTEL®, ADVANCED MICRO DEVICES®, ARM®, APPLE®, TAIWAN SEMICONDUCTOR MANUFACTURING®, QUALCOMM®, or other manufacturer. The computer system 24 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When the central processing units or chipsets execute instructions to perform "operations," this could include the central processing unit or chipset performing the operations directly and/or facilitating, directing, or cooperating with another device or component to perform the operations.

The computer system 24 may use packetized communications. When the computer system 24 communicates via the cloud computing network/environment 40 (illustrated in FIG. 1), information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The cloud computing network/environment 40 may utilize a signaling standard. The cloud computing network/environment 40 and/or the computer cluster 34 may mostly use wired networks to interconnect the network members. However, the computing network/environment 40 and/or the computer cluster 34 may utilize a communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or other variant of the GSM/CDMA/TDMA signaling standard. The computing network/environment 40 and/or the computer cluster 34 may also utilize other standards, such as the I.E.E.E. 802 family of standards, the Industrial, Scientific, and Medical band of the electromagnetic spectrum, BLUETOOTH®, low-power or near-field, and other standard or value.

The preliminary tag search 60 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for implementing the preliminary tag search 60, as the above paragraphs explain.

The diagrams, schematics, illustrations, and the like represent conceptual views or processes illustrating examples of the cross-cluster search optimization 22. The functions of the various elements shown in the figures may be provided through the use of dedicated hardware as well as hardware capable of executing instructions. The hardware, processes, methods, and/or operating systems described herein are for illustrative purposes and, thus, are not intended to be limited to a particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system for identifying a successful computing cross-cluster search, comprising:

receiving, by the computer system, a database query specifying a query parameter;

prior to conducting multiple computing cross-cluster searches associated with the database query, performing, by the computer system, a preliminary tag search by mapping the query parameter to a network address assigned to a computing cluster storing search results that answer the database query;

in response to the preliminary tag search, conducting, by the computer system, the successful computing cross-cluster search identified by the preliminary tag search as the computing cluster storing the search results that answer the database query; and declining, by the computer system, an unsuccessful computing cross-cluster search of the multiple computing cross-cluster searches not producing the search results.

2. The method of claim 1, further comprising querying the computing cluster identified by the preliminary tag search.

3. The method of claim 1, further comprising querying a computing cluster node identified by the preliminary tag search.

4. The method of claim 1, further comprising identifying an Internet Protocol address associated with the computing cluster storing the search results that answer the database query.

5. The method of claim 1, further comprising identifying the unsuccessful computing cross-cluster search.

6. The method of claim 1, further comprising identifying, based on the preliminary tag search, the unsuccessful computing cross-cluster search.

7. The method of claim 1, wherein the performing of the preliminary tag search further comprises comparing the query parameter specified by the database query to a clusteral tag inventory.

8. At least one computer system for identifying a computing cross-cluster search, comprising:

at least one central processing unit; and at least one local memory device storing instructions that, when executed by the at least one central processing unit, perform operations comprising:

receiving a database query specifying a query parameter;

prior to conducting multiple computing cross-cluster searches associated with the database query, performing a coordinator role associated with a mapreduce database framework and conducting a preliminary tag search by comparing the query parameter to a clusteral tag inventory that associates the query parameter to a computing cluster identifier associated with a computing cluster storing search results that answer the database query; and after performing the preliminary tag search that identifies the computing cluster identifier specified by the clusteral tag inventory, retrieving the search results that answer the database query by conducting only the computing cross-cluster search identified by the computing cluster identifier specified by the clusteral tag inventory.

9. The at least one computer system of claim 8, wherein the operations further comprise querying only the computing cluster identified by the computing cluster identifier.

10. The at least one computer system of claim 8, wherein the operations further comprise querying only a computing clusteral node identified by the computing cluster identifier.

11. The at least one computer system of claim 8, wherein the operations further comprise querying only the computing cluster associated with the computing cluster identifier specified by the clusteral tag inventory.

12. The at least one computer system of claim 8, wherein the operations further comprise declining to conduct an additional computing cross-cluster search in response to the preliminary tag search.

13. The at least one computer system of claim 8, wherein the operations further comprise determining another computing cross-cluster search of the multiple computing cross-cluster searches produces negative search results based on the preliminary tag search.

14. The at least one computer system of claim 8, wherein the operations further comprise declining to conduct the multiple computing cross-cluster searches in response to the preliminary tag search.

15. A memory device storing instructions that, when executed by at least one central processing unit, perform operations for identifying a computing cross-cluster search, the operations comprising:

receiving a database query specifying a cybersecurity event identifier as a query parameter;

prior to conducting multiple computing cross-cluster searches associated with a mapreduce database framework storing cybersecurity events, conducting, by a coordinator server associated with the mapreduce database framework, a preliminary tag search that compares the cybersecurity event identifier to a clusteral tag inventory that associates cybersecurity event identifiers to storage Internet Protocol (IP) addresses assigned to storage computing clusters storing the cybersecurity events;

in response to the preliminary tag search conducted prior to the multiple computing cross-cluster searches associated with the mapreduce database framework storing the cybersecurity events, identifying, by the coordinator server associated with the mapreduce database framework, a storage IP address of the storage IP addresses specified by the clusteral tag inventory that is associated with the cybersecurity event identifier specified by the database query; and after performing the preliminary tag search that identifies the storage IP address specified by the clusteral tag inventory, conducting, by the coordinator server associated with the mapreduce database framework, only the computing cross-cluster search identified by the storage IP address specified by the clusteral tag inventory.

16. The memory device of claim 15, wherein the operations further comprise querying only a computing cluster identified by the cluster identifier.

17. The memory device of claim 15, wherein the operations further comprise querying only a clusteral node identified by the cluster identifier.

18. The memory device of claim 15, wherein the operations further comprise declining to conduct an additional computing cross-cluster search in response to the preliminary tag search.

19. The memory device of claim 15, wherein the operations further comprise determining another computing cross-cluster search of the multiple computing cross-cluster searches produces negative search results based on the preliminary tag search.

20. The memory device of claim 15, wherein the operations further comprise declining to conduct additional ones of the multiple computing cross-cluster searches in response to the preliminary tag search.

\* \* \* \* \*